(12) United States Patent
Weinert et al.

(10) Patent No.: US 12,479,947 B2
(45) Date of Patent: Nov. 25, 2025

(54) CURABLE COMPOSITIONS USEFUL FOR OBTAINING NON-SENSITIZING CURED PRODUCTS

(71) Applicant: Arkema France, Colombes (FR)

(72) Inventors: Zackariah J. Weinert, Exton, PA (US); Mohana Nagda, King of Prussia, PA (US)

(73) Assignee: Arkema France, Puteaux (FR)

( * ) Notice: Subject to any disclaimer, the term of this patent is extended or adjusted under 35 U.S.C. 154(b) by 897 days.

(21) Appl. No.: 17/628,259

(22) PCT Filed: Jul. 10, 2020

(86) PCT No.: PCT/IB2020/000628
§ 371 (c)(1),
(2) Date: Jan. 19, 2022

(87) PCT Pub. No.: WO2021/014219
PCT Pub. Date: Jan. 28, 2021

(65) Prior Publication Data
US 2022/0411561 A1 Dec. 29, 2022

Related U.S. Application Data

(60) Provisional application No. 63/012,477, filed on Apr. 20, 2020, provisional application No. 62/876,015, filed on Jul. 19, 2019.

(51) Int. Cl.
*C08F 290/06* (2006.01)
*C09J 7/38* (2018.01)
*C09J 11/08* (2006.01)
*C09J 175/14* (2006.01)

(52) U.S. Cl.
CPC ........... *C08F 290/067* (2013.01); *C09J 7/385* (2018.01); *C09J 11/08* (2013.01); *C09J 175/14* (2013.01); *C09J 2301/302* (2020.08); *C09J 2301/414* (2020.08); *C09J 2433/00* (2013.01); *C09J 2475/00* (2013.01)

(58) Field of Classification Search
USPC .......................................... 428/355; 528/190
See application file for complete search history.

(56) References Cited

U.S. PATENT DOCUMENTS

| | | | |
|---|---|---|---|
| 2,313,501 A | 3/1943 | Bachman et al. | |
| 2,330,033 A | 9/1943 | D'Alelio | |
| 3,221,745 A | 12/1965 | Coover, Jr. et al. | |
| 3,523,097 A | 8/1970 | Coover, Jr. et al. | |
| 3,758,550 A | 9/1973 | Eck et al. | |
| 4,049,698 A | 9/1977 | Hawkins et al. | |
| 4,160,864 A | 7/1979 | Ponticello et al. | |
| 4,181,752 A | 1/1980 | Martens et al. | |
| 4,438,177 A | 3/1984 | Potter et al. | |
| 5,142,098 A | 8/1992 | Bru-Magniez et al. | |
| 5,302,629 A | 4/1994 | Berejka | |
| 5,308,887 A | 5/1994 | Ko et al. | |
| 5,464,659 A | 11/1995 | Melancon et al. | |
| 5,550,172 A | 8/1996 | Regula et al. | |
| 5,618,899 A * | 4/1997 | Appelt | A61L 15/58 522/182 |
| 5,624,763 A | 4/1997 | Melancon et al. | |
| 6,441,092 B1 | 8/2002 | Gieselman | |
| 6,512,023 B1 | 1/2003 | Malofsky et al. | |
| 6,514,606 B2 | 2/2003 | Kinoshita et al. | |
| 6,518,343 B1 | 2/2003 | Lucast et al. | |
| 6,610,078 B1 | 8/2003 | Bru-Magniez et al. | |
| 8,609,885 B2 | 12/2013 | Malofsky et al. | |
| 8,710,112 B2 | 4/2014 | Kim et al. | |
| 11,147,722 B2 | 10/2021 | Zhou et al. | |
| 2008/0220251 A1 | 9/2008 | Takaki | |
| 2010/0121304 A1 | 5/2010 | Zhou et al. | |
| 2010/0330860 A1 | 12/2010 | Puerkner et al. | |
| 2011/0189493 A1 | 8/2011 | Ott et al. | |
| 2015/0152297 A1* | 6/2015 | Zanzottera | A61L 15/24 427/516 |
| 2016/0121018 A1 | 5/2016 | Watanabe et al. | |
| 2017/0081565 A1 | 3/2017 | Chatterjee et al. | |
| 2018/0028431 A1 | 2/2018 | Chiattello et al. | |

FOREIGN PATENT DOCUMENTS

| | | | |
|---|---|---|---|
| CA | 2123645 | 3/2002 | |
| CN | 109575848 A | 4/2019 | |
| EP | 587752 A1 * | 3/1994 | ............... C09J 4/00 |
| EP | 0628616 A1 | 12/1994 | |
| EP | 0930899 B1 | 3/1998 | |
| JP | 3209781 A2 | 9/1991 | |
| WO | WO2012054616 A2 | 4/2012 | |
| WO | WO2013082222 A1 | 6/2013 | |

\* cited by examiner

*Primary Examiner* — Terressa Boykin
(74) *Attorney, Agent, or Firm* — Christopher R. Lewis

(57) ABSTRACT

Non-sensitizing pressure sensitive adhesives which are useful in medical applications and other uses where an adhesive is in contact with skin are obtained by energy-curing compositions containing one or more acrylate-functionalized compounds and possibly other components which are selected such that the cured adhesive passes an in vitro cytotoxicity test in accordance with ISO 10993-5 (2009).

22 Claims, No Drawings

CURABLE COMPOSITIONS USEFUL FOR OBTAINING NON-SENSITIZING CURED PRODUCTS

CROSS-REFERENCE TO RELATED APPLICATIONS

This application is a U.S. national stage application under 35 U.S.C. § 371 of international application number PCT/IB2020/000628, filed Jul. 10, 2020, which claims priority to U.S. patent application Nos. 62/876,015, filed Jul. 19, 2019, and 63/012,477, filed Apr. 20, 2020.

FIELD OF THE INVENTION

The invention pertains to compositions containing acrylate-functionalized compounds that are capable of being cured by exposure to light to form products such as non-sensitizing pressure sensitive adhesives and non-tacky films that are safe for contact with mammalian skin.

BACKGROUND OF THE INVENTION

Pressure sensitive adhesives are adhesives which are capable of quickly adhering to a substrate (such as human skin) upon application of only a light pressure. In many applications, a pressure sensitive adhesive is further required to be relatively easily removed from the surface to which it was applied (such as human skin) through a comparatively light pulling force. Thus, pressure sensitive adhesives are characterized by an innate capacity to achieve such instantaneous adhesion to a surface without change in their physical state and without activation, such as activation by evaporation of solvent or application of heat, and also by having sufficient internal strength such that the adhesive material will not break up before the bond between the adhesive material and the substrate surface ruptures. To achieve such properties, pressure sensitive adhesives typically possess viscous properties in order to flow and to be able to dissipate energy during the adhesive bonding process. Generally speaking, pressure sensitive adhesives are characterized by their tack, peel adhesion, and shear resistance properties. Tack measures the adhesive's ability to adhere quickly to a substrate surface, peel adhesion is a measure of the adhesive's ability to resist removal through peeling, and shear relates to the adhesive's ability to hold in position when shear forces are applied.

Energy curing (EC) refers to the conversion of a curable composition (which may be referred to as a "resin") to polymer using an energy source such as an electron beam (EB), ultraviolet (UV) lamp, or light-emitting diode (LED). This type of curing method has certain benefits over other technologies such as solvent-borne compositions, water-borne compositions, hot melt compositions, moisture-curing compositions, and thermal-curing compositions. For example, the advantages of EC over solvent-borne technology include the elimination of costly solvent-extraction systems, more efficient (atom-economical) chemistry, lower energy costs, and a solvent-free environment for workers. As compared to water-borne technology, EC allows for faster and more efficient manufacturing due to the elimination of a bake step. In a third example, EC pressure sensitive adhesives (PSAs) are often advantageous in comparison to hot melt adhesives. Hot melt adhesives are typically heated to temperatures of about 300-350° F. when applied to substrates, while EC-PSAs can be used at room temperature. Thus, EC-PSAs overcome a major limitation of hot melt adhesives: the latter can only be applied to substrates that can withstand higher temperatures. Another valuable attribute of EC-PSAs is their ability to crosslink upon curing. The added covalent linkages between polymer chains improves the adhesive's shear resistance and chemical resistance. Conventional hot melt adhesives, by comparison, are not crosslinked.

Among the three main EC methods, LED-curing has several major benefits. Unlike EB or UV, LED has very low energy usage. LEDs can also be turned on and off instantaneously without the need for long warm-up times. When comparing LED to UV, it is known that LED sources have longer lifetimes and greater consistency of irradiance and dose. In many applications, EC by LED is more advantageous than all other competing technologies.

For decades, EC has provided benefits to many applications. Wood coatings, plastic coatings, glass coatings, metal coatings, finish films, mechanical performance coatings, durable hardcoats, inkjet inks, flexographic inks, screen inks, over-print varnishes, nail gel resins, dental materials, pressure sensitive adhesives, anaerobic adhesives, laminating adhesives, electronic display components, and photoresists are some materials that have benefited from the development and implementation of EC technology. However, one application area that has been left out from such advancements is skin-contact adhesives.

The reason that EC has not been adopted for use in skin-contact adhesives is because of skin sensitization issues. By comparison, EC-PSAs are used in applications where skin sensitization is not an issue. Many EC materials other than PSAs have been developed that are safe for body contact, such as UV-cured dental resins. It is the unique material requirements of adhesives, especially PSAs, that explain the current absence of EC-PSAs on the market. To understand why it has not been possible to make non-sensitizing PSAs, it is important to understand what makes an EC material sensitizing. For a cured material to be sensitizing, the material needs to contain an amount of residual uncured component(s) of the resin that can migrate to the surface of the material. And, second, the residual uncured component(s) must have a sensitizing effect on the skin. Non-sensitizing materials work by overcoming the first or second (or both) of these causes.

A common approach to minimize the amount of uncured resin component that is at the surface of an EC material is referred to as "low-migration". Low migration compositions rely on resin components that have a high number of (meth)acrylate functional groups per molecule, such as 2, 3, 4, or more (meth)acrylate groups per molecule. Thus, at a given percent conversion, a low-migration cured material will have a dramatically lower percentage of resin component molecules that are not covalently bound into the polymer chain/network, as compared to a conventional EC material. Accordingly, there are fewer untethered resin molecules in or on the cured material. Low-migration materials may also use higher purity resin components as compared to conventional resin components, as contaminants may not react into the polymer network and could therefore migrate through or from it. A third approach to achieving low migration is to select a suitable photoinitiator (if one is required) where the photoinitiator does not leave residual migratable (unbound) species after curing. Finally, a fourth approach to formulating low-migration materials is to use a lower amount of low molecular weight resin components. Residual uncured resin components have less ability to migrate to the surface of a cured polymeric product if they are higher in molecular weight. In a conventional EC material, residual uncured resin components (e.g., (meth) acrylates) that are not at the surface could pass through the polymer network to the material surface. When the fourth low migration approach is used, nearly all the residual uncured resin at the surface is uncured resin that was present at the surface immediately after curing. In low-migration materials, a smaller percentage of the cured material's residual uncured resin components is detected at the surface compared to conventional EC materials. Put another way, a smaller percentage of the low-migration material's residual uncured resin has the potential to come into contact with, and thus cause harm to, skin. Using high molecular weight resin components (e.g., high molecular weight (meth)acrylates), high purity resin components (e.g., high purity (meth) acrylates), and suitable photoinitiator (if UV or LED are used to cure the curable composition)) can be part of a strategy to obtain a low-migration cured product, but are insufficient alone. A high crosslink density in the cured product must also be achieved.

EC-PSAs are not amenable to the low migration approach to achieving skin safety. In order to achieve PSA properties, EC-PSAs are typically formulated with low functionality resin components. Once cured, the EC-PSA may have crosslinks, but at a very low crosslink density compared to low-migration materials. Increasing the crosslink density of a PSA will dramatically reduce its adhesive properties, such as peel strength and tack. Only a small amount of additional crosslinks are usually required to render the cured material non-adhesive. An exemplary EC-PSA formulation is: 25-75% high molecular weight acrylate oligomer with two or fewer (meth)acrylate groups per molecule, 10-50% high Tg monomer with one (meth)acrylate group per molecule, 10-50% low Tg monomer with one (meth)acrylate group per molecule, optional 0.1-10% photoinitiator (used for UV- or LED-curable formulations), and 0-20% optional tackifiers or other nonfunctional (non-reactive) additives. An otherwise identical composition except for the addition of 10% of difunctional acrylate monomer often will produce a coating-like material with no adhesive properties. Due to these material constraints, EC-PSAs have a higher content of residual uncured (i.e., untethered) resin components as compared to most other EC-materials.

Another approach to obtaining non-sensitizing EC-materials addresses the requisite cause of skin sensitization: the irritancy of the uncured resin component(s) present in the curable composition. A known method for reducing the sensitization issues caused by uncured resin components is to use methacrylate-functional resin components instead of acrylate-functional resin components. For example, most EC-nail gel formulations consist primarily of methacrylate resins with little or no acrylate resin content.

However, EC-PSA formulations are not amenable to the use of methacrylates. The reason is that methacrylates polymerize much more slowly than do acrylates. In other EC applications, the slow cure speed of methacrylates in an EC composition is compensated for by the inclusion of higher functionality resin components (e.g., tri- and tetra-(meth) acrylates) in the composition. EC-PSAs, which cannot use fast-curing crosslinkers, cure extremely slowly if any significant amount of methacrylate is present. Take, for example, the generic EC-PSA composition described above. To illustrate the effect of using methacrylates in an EC-PSA, if 10% of an acrylate monomer is replaced with its methacrylate analogue the composition may not cure. In many cases, even a ten-fold increase in the energy dose is insufficient to overcome this problem. Thus, EC-PSAs cannot rely on non-sensitizing methacrylate resins to achieve non-sensitizing cured properties.

Accordingly, it is clear that there is a need to develop formulations that are capable of being rapidly cured by energy-curing methods (e.g., UV, LED, and EB) to provide products simultaneously having pressure sensitive properties and little to no tendency to cause sensitization when brought into contact with skin.

SUMMARY OF THE INVENTION

One aspect of the present invention is a non-sensitizing EC-PSA, i.e., an energy-cured pressure sensitive adhesive which is non-sensitizing when contacted with mammalian skin, as determined by its ability to pass an in vitro cytotoxicity test as measured in accordance with ISO 10993-5 (2009).

Related aspects of the invention pertain to curable compositions, which are typically liquid at room temperature (i.e., liquid formulations), that can be converted by energy curing into non-sensitizing pressure sensitive adhesives; processes for preparing the curable compositions; the conversion of the curable compositions into non-sensitizing pressure sensitive adhesives by energy-curing; and articles that contain such pressure sensitive adhesives.

A further aspect of the invention relates to a non-sensitizing energy-cured material that does not exhibit adhesive properties, but is capable of being used as a substrate for the application and subsequent energy-curing of the aforementioned curable compositions to provide non-sensitizing pressure sensitive adhesives. With regard to such non-adhesive material, the present invention encompasses curable compositions (typically in the form of liquid formulations at room temperature) that can be energy-cured to provide non-sensitizing materials; processes for preparing such curable compositions; the conversion of such curable compositions into non-sensitizing, non-adhesive materials by energy-curing; methods for using such materials as substrates for non-sensitizing energy-cured pressure sensitive adhesives; and articles that contain both a non-sensitizing pressure sensitive adhesive in accordance with the invention and a non-sensitizing non-adhesive material in accordance with the invention in contact with one another (where the non-sensitizing non-adhesive material functions as a support or carrier for the non-sensitizing pressure sensitive adhesive or vice versa).

Thus, one aspect of the present invention provides curable compositions, wherein such compositions comprise, consist essentially of or consist of:

a) an acrylate-functionalized component comprising, consisting essentially of or consisting of at least one acrylate-functionalized compound selected from the group consisting of:
  i) acrylates of ethoxylated phenols containing 3 to 5 oxyethylene units per molecule;
  ii) acrylates of propoxylated nonyl phenols containing 1 to 4 oxypropylene units per molecule;
  iii) 6-methyl-1-heptanol acrylate or isooctyl acrylate;
  iv) acrylates of methoxy polyethylene glycols, wherein the methoxy polyethylene glycols have a number average molecular weight of 300 to 600 g/mol;
  v) tetraethylene glycol diacrylates;
  vi) acrylates of propoxylated tetrahydro-2-furanmethanols containing 1 to 3 oxypropylene units per molecule;

vii) diacrylates of linear polybutadiene polymers, where the polymers are linear polybutadiene polymers with hydroxyl end groups (the hydroxyl end groups being acrylated);
viii) diacrylates of bisphenol A and ethoxylated bisphenol A containing 1 to 35 oxyethylene units per molecule;
ix) diacrylates of ethoxylated 1,6-hexanediols containing 1 to 6 oxyethylene units per molecule;
x) diacrylates of propoxylated 1,6-hexanediols containing 1 to 4 oxypropylene units per molecule;
xi) diacrylates of ethoxylated neopentyl glycols containing 1 to 3 oxyethylene units per molecule;
xii) acrylate-terminated oligomers obtainable by reaction of caprolactone acrylate with a polyisocyanate selected from the group consisting of dicyclohexylmethane diisocyanate, toluene diisocyanate, and hexamethylene diisocyanate biuret;
xiii) acrylate-terminated oligomers obtainable by reaction of 2-hydroxyethyl acrylate, isophorone diisocyanate and neopentyl glycol-co-adipic acid polyester polyol, wherein the polyester polyol has a number average molecular weight of 400 to 2500 g/mol;
xiv) acrylate-terminated oligomers obtainable by reaction of 2-hydroxyethyl acrylate, a diisocyanate selected from isophorone diisocyanate or toluene diisocyanate, and polypropylene glycol, wherein the polypropylene glycol is a diol or triol and has a number average molecular weight of 800 to 5000 g/mol;
xv) acrylate-terminated oligomers obtainable by reaction of 2-hydroxyethyl acrylate, a diisocyanate selected from isophorone diisocyanate or dicyclohexylmethane diisocyanate, and polytetramethylene ether glycol, wherein the polytetramethylene ether glycol has a number average molecular weight of 500 to 1200 g/mol;
xvi) acrylate-terminated oligomers obtainable by reaction of 2-hydroxyethyl acrylate, toluene diisocyanate, and ethylene glycol-co-propylene glycol-co-adipic acid polyester polyol, wherein the polyester polyol has a number average molecular weight of 2500 to 3500 g/mol;
xvii) acrylate-terminated oligomers obtainable by reaction of 2-hydroxyethyl acrylate, a polyisocyanate selected from toluene diisocyanate or dicyclohexylmethane diisocyanate, and ethylene glycol-co-adipic acid polyester polyol, wherein the polyester polyol has a number average molecular weight of 500 to 1000 g/mol;
xviii) acrylate-terminated oligomers obtainable by reaction of 2-hydroxyethyl acrylate, isophorone diisocyanate, and hydroxyl-terminated polysiloxane/polyethylene oxide block copolymer, wherein the hydroxyl-terminated polysiloxane/polyethylene oxide block copolymer has a number average molecular weight of 1500 to 3000 g/mol;
xix) acrylate-terminated oligomers obtainable by reaction of acrylic acid and glycidyl ethers of bisphenol A;
xx) acrylate-terminated oligomers obtainable by reaction of acrylic acid, glycidyl ethers of bisphenol A, diethylene glycol, and phthalic anhydride; xxi) acrylate-terminated oligomers obtainable by reaction of acrylic acid and glycidyl neodecanoate;
xxii) acrylate-terminated oligomers obtainable by reaction of 2-hydroxyethyl acrylate and hexamethylene diisocyanate biuret;
xxiii) acrylate-terminated oligomers obtainable by reaction of acrylic acid and unsaturated fatty acid dimer diol; and
xxiv) acrylate-terminated oligomers obtainable by reaction of acrylic acid, toluene diisocyanate, and bisphenol A;
b) 0 to 5% by weight in total, based on the weight of the curable composition, of (meth)acrylate-functionalized compounds comprising three or more (meth)acrylate functional groups per molecule;
c) optionally, at least one comonomer having structure $R^a R^b C=CHR^c$, wherein $R^a$ and $R^b$ are the same as or different from each other and are selected from $-C(=O)XR^d$, $-CH_2C(=O)XR^e$, and $-C(=O)R^f$, subject to the proviso that $R^a$ and $R^b$ are not both $-CH_2C(=O)XR^e$; wherein each X is independently O or $NR^i$, with each $R^i$ being independently selected from H or an organic group, wherein each $R^d$ and $R^e$ is independently selected from H, alkali metal, or an organic group; and wherein each $R^f$ is an organic group; or wherein two of $R^d$, $R^e$ or $R^f$ are taken together with the atoms to which they are bound to form a ring;
d) optionally, at least one tackifier;
e) optionally, at least one initiator system;
f) optionally, at least one additive which is not a tackifier or part of an initiator system;
wherein:
the curable composition has a ratio of moles of methacrylate functional groups to moles of acrylate functional groups of 0:1 to 1:1; and
the curable composition, when cured, provides a pressure sensitive adhesive which passes an in vitro cytotoxicity test as measured in accordance with ISO 10993-5 (2009).

Such curable compositions may also be referred to herein as "non-sensitizing energy-curable pressure sensitive adhesive formulations."

As used herein, the term "cured," when used to characterize a product prepared from a curable composition containing one or more monomeric and/or oligomeric reactants, means that the composition after being subjected to radiation results in a solid three dimensional polymeric network, which may or may not still contain some residual amount of unreacted monomeric and/or oligomeric reactants.

The present invention also provides a method of making pressure sensitive adhesives, wherein the method comprises curing (e.g., energy-curing) the above-mentioned non-sensitizing energy-curable pressure sensitive adhesive formulations. The pressure sensitive adhesives thereby obtained pass an in vitro cytotoxicity test as measured in accordance with ISO 10993-5 (2009).

Also provided by the present invention are films, wherein the films are pressure sensitive adhesives obtained by curing the above-mentioned non-sensitizing energy-curable pressure sensitive adhesive formulations and pass an in vitro cytotoxicity test as measured in accordance with ISO 10993-5 (2009). Such films may be present on a substrate.

Articles are also provided in aspects of the present invention, wherein the articles comprise films which are pressure sensitive adhesives obtained by curing the above-mentioned non-sensitizing energy-curable pressure sensitive adhesive formulations and pass an in vitro cytotoxicity test as measured in accordance with ISO 10993-5 (2009).

The present invention additionally provides curable compositions which comprise, consist essentially of or consist of:
  a) a (meth)acrylate-functionalized component comprising, consisting essentially of or consisting of at least one (meth)acrylate-functionalized compound selected from the group consisting of:
    i) acrylates of ethoxylated phenols containing 3 to 5 oxyethylene units per molecule;
    ii) acrylates of propoxylated nonyl phenols containing 1 to 4 oxypropylene units per molecule;
    iii) 6-methyl-1-heptanol acrylate or isooctyl acrylate;
    iv) acrylates of methoxy polyethylene glycols, wherein the methoxy polyethylene glycols have a number average molecular weight of 300 to 600 g/mol;
    v) tetraethylene glycol diacrylates;
    vi) acrylates of propoxylated tetrahydro-2-furanmethanols containing 1 to 3 oxypropylene units per molecule;
    vii) diacrylates of linear polybutadiene polymers, where the polymers are linear polybutadiene polymers with hydroxyl end groups;
    viii) diacrylates of bisphenol A and ethoxylated bisphenol A containing 1 to 35 oxyethylene units per molecule;
    ix) diacrylates of ethoxylated 1,6-hexanediols containing 1 to 6 oxyethylene units per molecule;
    x) diacrylates of propoxylated 1,6-hexanediols containing 1 to 4 oxypropylene units per molecule;
    xi) diacrylates of ethoxylated neopentyl glycols containing 1 to 3 oxyethylene units per molecule;
    xii) acrylate-terminated oligomers obtainable by reaction of caprolactone acrylate with a polyisocyanate selected from the group consisting of dicyclohexylmethane diisocyanate, toluene diisocyanate, and hexamethylene diisocyanate biuret;
    xiii) acrylate-terminated oligomers obtainable by reaction of 2-hydroxyethyl acrylate, isophorone diisocyanate and neopentyl glycol-co-adipic acid polyester polyol, wherein the polyester polyol has a number average molecular weight of 400 to 2500 g/mol;
    xiv) acrylate-terminated oligomers obtainable by reaction of 2-hydroxyethyl acrylate, a diisocyanate selected from isophorone diisocyanate or toluene diisocyanate, and polypropylene glycol, wherein the polypropylene glycol is a diol or triol and has a number average molecular weight of 800 to 5000 g/mol;
    xv) acrylate-terminated oligomers obtainable by reaction of 2-hydroxyethyl acrylate, a diisocyanate selected from isophorone diisocyanate or dicyclohexylmethane diisocyanate, and polytetramethylene ether glycol, wherein the polytetramethylene ether glycol has a number average molecular weight of 500 to 1200 g/mol;
    xvi) acrylate-terminated oligomers obtainable by reaction of 2-hydroxyethyl acrylate, toluene diisocyanate, and ethylene glycol-co-propylene glycol-co-adipic acid polyester polyol, wherein the polyester polyol has a number average molecular weight of 2500 to 3500 g/mol;
    xvii) acrylate-terminated oligomers obtainable by reaction of 2-hydroxyethyl acrylate, a polyisocyanate selected from toluene diisocyanate or dicyclohexylmethane diisocyanate, and ethylene glycol-co-adipic acid polyester polyol, wherein the polyester polyol has a number average molecular weight of 500 to 1000 g/mol;
    xviii) acrylate-terminated oligomers obtainable by reaction of 2-hydroxyethyl acrylate, isophorone diisocyanate, and hydroxyl-terminated polysiloxane/polyethylene oxide block copolymer, wherein the hydroxyl-terminated polysiloxane/polyethylene oxide block copolymer has a number average molecular weight of 1500 to 3000 g/mol;
    xix) acrylate-terminated oligomers obtainable by reaction of acrylic acid and glycidyl ethers of bisphenol A;
    xx) acrylate-terminated oligomers obtainable by reaction of acrylic acid, glycidyl ethers of bisphenol A, diethylene glycol, and phthalic anhydride;
    xxi) acrylate-terminated oligomers obtainable by reaction of acrylic acid and glycidyl neodecanoate;
    xxii) acrylate-terminated oligomers obtainable by reaction of 2-hydroxyethyl acrylate and hexamethylene diisocyanate biuret;
    xxiii) acrylate-terminated oligomers obtainable by reaction of acrylic acid and unsaturated fatty acid dimer diol;
    xxiv) acrylate-terminated oligomers obtainable by reaction of acrylic acid, toluene diisocyanate, and bisphenol A; and
    xxv) methacrylates of alcohols selected from the group consisting of tetrahydrofurfuryl alcohol; 8-methyl-1-nonanol; isobornyl alcohol; lauryl alcohol; stearyl alcohol; tetraethylene glycol; polyethylene glycols having a number average molecular weight of 150 to 250 g/mol; 1,4-butanediol; 1,6-hexane diol; diethylene glycol; neopentyl glycol; 1,3-butylene glycol; ethoxylated bisphenol A containing 1 to 35 oxyalkylene units per molecule; and 2-[2-(2-ethoxyethoxy)ethoxy]ethanol;
  b) optionally, at least one comonomer having structure $R^aR^bC=CHR^c$, wherein $R^a$ and $R^b$ are the same as or different from each other and are selected from $—C(=O)XR^d$, $—CH_2C(=O)XR^e$, and $—C(=O)R^f$, subject to the proviso that $R^a$ and $R^b$ are not both $—CH_2C(=O)XR^e$; wherein each X is independently O or $NR^i$, with each $R^i$ being independently selected from H or an organic group, wherein each $R^d$ and $R^e$ is independently selected from H, alkali metal, or an organic group; and wherein each $R^f$ is an organic group; or wherein two of $R^d$, $R^e$ or $R^f$ are taken together with the atoms to which they are bound to form a ring;
  c) optionally, at least one initiator system;
  d) optionally, at least one additive which is not part of an initiator system;
wherein:
the curable composition has a ratio of moles of methacrylate functional groups to moles of acrylate functional groups of 0:1 to 1:1; and
the curable composition, when cured, provides a solid polymeric material which is non-tacky (i.e., is not a pressure sensitive adhesive) and which passes an in vitro cytotoxicity test as measured in accordance with ISO 10993-5 (2009).

Such curable compositions may also be referred to herein as "non-sensitizing energy-curable non-adhesive formulations". As used herein, the terms "non-adhesive" and "non-tacky" both refer to a material that has a probe tack of less than 0.82 lb/in$^2$ as measured according to ASTM-D2979-95 using a ChemInstruments® PT-500 Inverted Probe Machine in the tension-peak mode. Based on the surface area of the PT-500's inverted probe that contacts the sample, 0.82 lb/in² corresponds to an instrument readout of 0.100 lb.

The present invention further provides methods for making non-tacky films, comprising curing (e.g., energy-curing) one or more layers of the above-described non-sensitizing energy-curable non-adhesive formulations.

Also provided by the present invention are non-tacky films obtained by curing (e.g., energy-curing) one or more layers of the above-described non-sensitizing energy-curable non-adhesive formulations.

Articles comprising non-tacky films obtained by curing (e.g., energy-curing) one or more layers of the above-described non-sensitizing energy-curable non-adhesive formulations are additionally provided by the present invention.

DETAILED DESCRIPTION OF CERTAIN EMBODIMENTS OF THE INVENTION

Acrylate-Functionalized Compounds

The curable compositions of the present invention comprise one or more of the following acrylate-functionalized compounds i)-xxiv):

i) Acrylates of ethoxylated phenols containing 3 to 5 oxyethylene units per molecule. Such compounds correspond to the general formula Ar—O—(CH$_2$CH$_2$O)$_n$C(=O)CH=CH$_2$, wherein Ar is phenyl and n is an integer of 3-5.

ii) Acrylates of propoxylated nonyl phenols containing 1 to 4 oxypropylene units per molecule. Such compounds correspond to the general formula nonyl-Ar—O—(CHRCHR'O)$_n$C(=O)CH=CH$_2$, wherein Ar is phenyl, one of R and R' is hydrogen and one of R and R' is methyl, and n is 1-4 on average.

iii) 6-Methyl-1-heptanol acrylate or isooctyl acrylate.

iv) Acrylates of methoxy polyethylene glycols, wherein the methoxy polyethylene glycols have a number average molecular weight of 300 to 600 g/mol. Such compounds correspond to the general formula H$_3$C—O—(CH$_2$CH$_2$O)$_n$C(=O)CH=CH$_2$, wherein n is about 6 to about 14 on average.

v) Tetraethylene glycol diacrylate.

vi) Acrylates of propoxylated tetrahydro-2-furanmethanols containing 1 to 3 oxypropylene units (e.g., 2 oxypropylene units) per molecule. Such acrylates may correspond to the general structure THF—CH$_2$O—(CH$_2$CH(CH$_3$)O)$_n$—C(=O)CH=CH$_2$, where THF is tetrahydrofuryl and n=1-3.

vii) Diacrylates of linear polybutadiene polymers, where the polymers are linear polybutadiene polymers with hydroxyl end groups (in particular, diacrylates of linear polybutadiene polymers having a number average molecular weight of 1500 to 3000 g/mol, a polydispersity (M$_w$/M$_n$) of about 1.3 to about 1.4, a 1,2-vinyl content of 55 to 75 weight percent, a 1,4-cis content of 10 to 15 weight percent, and a 1,4-trans content of 15 to 30 weight percent).

viii) Diacrylates of bisphenol A and ethoxylated bisphenol A containing 1 to 35 oxyethylene units per molecule.

ix) Diacrylates of ethoxylated 1,6-hexanediols containing 1 to 6 oxyethylene units per molecule.

x) Diacrylates of propoxylated 1,6-hexanediols containing 1 to 4 oxypropylene units per molecule.

xi) Diacrylates of ethoxylated neopentyl glycols containing 1 to 3 oxyethylene units per molecule.

xii) Acrylate-terminated oligomers obtainable by reaction of caprolactone acrylate with a polyisocyanate selected from the group consisting of dicyclohexylmethane diisocyanate, toluene diisocyanate, and hexamethylene diisocyanate biuret. As used herein, the term "caprolactone acrylate" refers to an acrylate-functionalized compound which can be obtained by reaction of a hydroxyalkyl acrylate with one or more molecules of caprolactone. Where the hydroxyalkyl acrylate is 2-hydroxyethyl acrylate, for example, the caprolactone acrylate may have the structure:

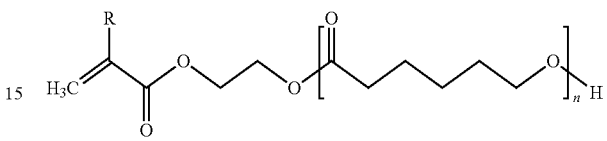

wherein n=at least 1 (e.g., 1-5) and R is H.

xiii) Acrylate-terminated oligomers obtainable by reaction of 2-hydroxyethyl acrylate, isophorone diisocyanate and neopentyl glycol-co-adipic acid polyester polyol, wherein the polyester polyol has a number average molecular weight of 400 to 2500 g/mol.

xiv) Acrylate-terminated oligomers obtainable by reaction of 2-hydroxyethyl acrylate, a diisocyanate selected from isophorone diisocyanate or toluene diisocyanate, and polypropylene glycol, wherein the polypropylene glycol is a diol or triol and has a number average molecular weight of 800 to 5000 g/mol.

xv) Acrylate-terminated oligomers obtainable by reaction of 2-hydroxyethyl acrylate, a diisocyanate selected from isophorone diisocyanate or dicyclohexylmethane diisocyanate, and polytetramethylene ether glycol, the polytetramethylene ether glycol having a number average molecular weight of 500 to 1200 g/mol.

xvi) Acrylate-terminated oligomers obtainable by reaction of 2-hydroxyethyl acrylate, toluene diisocyanate, and ethylene glycol-co-propylene glycol-co-adipic acid polyester polyol, the polyester polyol having a number average molecular weight of 2500 to 3500 g/mol.

xvii) Acrylate-terminated oligomers obtainable by reaction of 2-hydroxyethyl acrylate, a polyisocyanate selected from toluene diisocyanate or dicyclohexylmethane diisocyanate, and ethylene glycol-co-adipic acid polyester polyol, the polyester polyol having a number average molecular weight of 500 to 1000 g/mol.

xviii) Acrylate-terminated oligomers obtainable by reaction of 2-hydroxyethyl acrylate, isophorone diisocyanate, and hydroxyl-terminated polysiloxane/polyethylene oxide block copolymer, wherein the hydroxyl-terminated polysiloxane/polyethylene oxide block copolymer has a number average molecular weight of 1500 to 3000 g/mol.

xix) Acrylate-terminated oligomers obtainable by reaction of acrylic acid and glycidyl ethers of bisphenol A. Such oligomers may, for example, have structures corresponding to the formula: H$_2$C=CHC(=O)OCH$_2$CH(OH)O—Ar—C(CH$_3$)$_2$—Ar—OCH$_2$CH(OH)CH$_2$OC(=O)CH=CH$_2$
wherein Ar is a phenyl group.

xx) Acrylate-terminated oligomers obtainable by reaction of acrylic acid, glycidyl ethers of bisphenol A, diethylene glycol, and phthalic anhydride.

Such oligomers may be described as polyester acrylate oligomers.

xxi) Acrylate-terminated oligomers obtainable by reaction of acrylic acid and glycidyl neodecanoate. Such oligomers may have the structure $H_2C=CHC(=O)OCH_2CH(OH)CH_2OC(=O)C_9H_{19}$.

xxii) Acrylate-terminated oligomers obtainable by reaction of 2-hydroxyethyl acrylate and hexamethylene diisocyanate biuret.

xxiii) Acrylate-terminated oligomers obtainable by reaction of acrylic acid and unsaturated fatty acid dimer diol. In such oligomers, the hydroxyl groups of unsaturated fatty acid dimer diol (e.g., a $C_{36}$ dimer diol) are substituted with acrylate groups.

xxiv) Acrylate-terminated oligomers obtainable by reaction of acrylic acid, toluene diisocyanate, and bisphenol A. In such oligomers, a toluene diisocyanate molecule links together two bisphenol A molecules, with the remaining hydroxyl groups of the bisphenol A molecules being acrylated.

Acrylate-functionalized compounds i), ii), vi), viii), ix), x) and xi) are characterized with respect to the number of oxyalkylene units (e.g., oxyethylene units, oxypropylene units) per molecule they contain. Oxyethylene units have the structure —$CH_2CH_2$—O—, whereas oxypropylene units have the structure —$CH_2CH(CH_3)$—O—. Such acrylate-functionalized compounds may be single, discrete compounds having a uniform number of oxyalkylene units per molecule, or may be mixtures of such compounds containing molecules of different degrees of alkoxylation (in which case the number of oxyalkylene units refers to the average number of such oxyalkylene units per molecule).

As one of ordinary skill in the art would recognize, the term "6-methyl-1-heptanol acrylate" encompasses branched C8 isomers thereof which may be used alone or in combination with one another, with 6-methyl-1-heptanol, with other isomers, or with combinations thereof. Branched C8 isomers of 6-methyl-1-heptanol acrylate correspond to an alkyl acrylate wherein the alkyl is branched and has 8 carbon atoms. Said isomers may also be referred to as "isooctyl acrylate" and specific examples include 2-methyl-1-heptanol acrylate, 3-methyl-1-heptanol acrylate, 4-methyl-1-heptanol acrylate, 5-methyl-1-heptanol acrylate, 3,5-dimethylhexyl acrylate, 1-ethylhexyl acrylate, 2-ethylhexyl acrylate and 3-ethylhexyl acrylate.

With respect to acrylate-terminated oligomers xii-xviii, any suitable method known in the art may be employed to prepare such oligomers. As used herein, the phrase "obtainable by reaction of" is not intended to imply that the oligomers are necessarily produced by reacting the specific compounds which are listed. Rather, the listed compounds are merely descriptive of the "building blocks" present as residues in the oligomer.

For example, if an oligomer is described as "an acrylate-terminated oligomer obtainable by reaction of 2-hydroxyethyl acrylate, diisocyanate X and polyol Y," one suitable method for preparing such an oligomer is to first react diisocyanate X and polyol Y under conditions effective to obtain an isocyanate-terminated prepolymer (wherein molecules of diisocyanate X have reacted with hydroxyl groups of polyol Y), followed by reaction of the isocyanate-terminated prepolymer with 2-hydroxyethyl acrylate to form the oligomer (wherein the hydroxyl groups of the 2-hydroxyethyl acrylate have reacted with the free isocyanate groups of the isocyanate-terminated prepolymer). Alternatively, the oligomer could be prepared by reacting the 2-hydroxyethyl acrylate with diisocyanate X under conditions effective to provide an isocyanate-functionalized acrylate (from reaction of the hydroxyl group of the 2-hydroxyethyl acrylate with one isocyanate group of diisocyanate X), followed by reaction of the isocyanate-functionalized acrylate with polyol Y (wherein the unreacted isocyanate group of the isocyanate-functionalized acrylate has reacted with hydroxyl groups of polyol Y). In a still further embodiment, the oligomer may be prepared by charging the polyol, diisocyanate and 2-hydroxyethyl acrylate to a reactor and carrying out simultaneous reaction of all three components. It is also possible to carry out the synthesis of such oligomers under conditions wherein at least some chain extension of polyol Y takes place, such that two or more molecules of polyol Y are linked together by diisocyanate X.

According to preferred embodiments of the invention, the majority by weight of the energy-curable compounds present in the curable composition are acrylate-functionalized compounds selected from acrylate-functionalized compounds i)-xxiv). Thus, in advantageous embodiments of the invention, acrylate-functionalized compounds i)-xxiv) comprise at least 80%, at least 85%, at least 90%, at least 95%, at least 99% or 100% by weight of the total weight of energy-curable compounds or (meth)acrylate-functionalized compounds present in the curable composition.

Methacrylate-Functionalized Compounds

Due to the reactivity issues typically associated with methacrylate-functionalized compounds, it will generally be preferred to limit the amount of such compounds present in the curable compositions of the present invention. Accordingly, in advantageous embodiments, methacrylate-functionalized compounds represent not more than 40%, not more than 30%, not more than 20%, not more than 15%, not more than 10%, not more than 5%, or not more than 1% by weight of the total amount of energy-curable compounds present in the curable composition. In embodiments of the invention, the lower limit of the methacrylate-functionalized compounds is 0.01%, preferably 0.05%, more preferably 0.1%, and most preferably 1% by weight of the total amount of energy-curable compounds present in the curable composition. The curable composition may contain 0% by weight of methacrylate-functionalized compounds (i.e., no methacrylate-functionalized compounds).

Further, in preferred embodiments of the invention, the curable composition has a ratio of moles of methacrylate functional groups to moles of acrylate functional groups of 0:1 to 0.5:1; 0:1 to 0.4:1; 0:1 to 0.3:1; 0:1 to 0.2:1; 0:1 to 0.1:1; 0:1 to 0.05:1; or 0:1 to 0.01:1.

If any methacrylate-functionalized compounds are utilized in the curable composition, it or they should be selected from among methacrylate-functionalized compounds that do not interfere with the ability to obtain a cured product from the curable composition that passes an in vitro cytotoxicity test in accordance with ISO 10993-5 (2009).

Suitable methacrylate-functionalized compounds include: the methacrylate of tetrahydrofurfuryl alcohol (i.e., tetrahydrofurfuryl methacrylate); the methacrylate of 8-methyl-1-nonanol (i.e., 8-methyl-1-nonyl methacrylate); the methacrylate of isobornyl alcohol (i.e., isobornyl methacrylate); the methacrylate of lauryl alcohol (i.e., lauryl methacrylate); the methacrylate of stearyl alcohol (i.e., stearyl methacrylate); methacrylates of tetraethylene glycol (e.g., tetraethylene glycol dimethacrylate); methacrylates of polyethylene glycols, wherein the polyethylene glycols have a number average molecular weight of 150 to 250 g/mol (e.g., polyethylene glycol dimethacrylates); methacrylates of 1,4-butanediol (e.g., 1,4-butanediol dimethacrylate); methacrylates of 1,6-hexane diol (e.g., 1,6-hexane diol dimethacrylate); methacrylates of diethylene glycol (e.g., diethylene glycol dimethacrylate); methacrylates of neopentyl glycol (e.g., neopentyl glycol dimethacrylate); methacrylates of 1,3-butylene glycol (e.g., 1,3-butylene glycol dimethacrylate); methacrylates of ethoxylated bisphenol A containing 1 to 35 oxyalkylene units per molecule (e.g., bisphenol A ethoxylated with from 1 to 35 equivalents of ethylene oxide and then methacrylated); and the methacrylate of 2-[2-(2-ethoxyethoxy)ethoxy]ethanol (i.e., 2-[2-(2-ethoxyethoxy)ethoxy]ethanol methacrylate); and combinations thereof.

Preferably, if any methacrylate-functionalized compound is present in the curable composition, the above-mentioned methacrylate-functionalized compounds comprise at least 50%, at least 60%, at least 70%, at least 80%, at least 90%, at least 95%, or at least 99% by weight of the total amount of methacrylate-functionalized compounds in the curable composition. According to one embodiment, the curable composition does not contain any methacrylate-functionalized compound other than the above-mentioned methacrylate-functionalized compounds.

According to certain embodiments, the curable composition includes at least one acrylate-functionalized compound which is oligomeric and at least one acrylate-functionalized compound which is non-oligomeric (i.e., monomeric). For example, the curable composition may comprise at least one of acrylate-functionalized compounds i)-xi) and at least one of acrylate-functionalized compounds xii)-xxiv). In other embodiments, the curable composition may comprise at least one of acrylate-functionalized compounds i)-xi) and at least one of acrylate-functionalized compounds xiii)-xviii). In still further embodiments, the curable composition may comprise at least one acrylate-functionalized compound iii) and at least one acrylate-functionalized compound xiii). In the aforementioned embodiments, the specified acrylate-functionalized compounds may together comprise at least 80%, at least 85%, at least 90%, at least 95%, at least 99% or 100% by weight of the total weight of (meth)acrylate-functionalized compounds present in the curable composition. The weight ratio of oligomeric acrylate-functionalized compounds to monomeric acrylate-functionalized compounds in the curable composition may be varied as may be desired to achieve certain attributes or properties in the curable composition and/or cured articles prepared therefrom. For example, the weight ratio of oligomeric acrylate-functionalized compound(s): monomeric acrylate-functionalized compound(s) can be from 5:1 to 1:5, from 4:1 to 1:4, from 3:1 to 1:3, or from 2:1 to 1:2.

(Meth)Acrylate-Functionalized Compounds Comprising Three or More (Meth)Acrylate Functional Groups Per Molecule The curable compositions of the present invention may additionally comprise one or more (meth)acrylate-functionalized compounds comprising three or more (meth)acrylate functional groups per molecule. According to certain embodiments, the amount of such (meth)acrylate-functionalized compound(s) is limited, e.g., not more than 5% or not more than 4% in total by weight based on the total weight of the curable composition. In other embodiments, the amount of such (meth)acrylate-functionalized compound(s) is at least 0.5% or at least 1% in total by weight based on the total weight of the curable composition. For example, the curable composition may comprise 0% to 5%, 0.5% to 5%, 0% to 4%, 0.5% to 4%, or 1% to 3% by weight in total, based on the total weight of the curable composition, of one or more (meth)acrylate-functionalized compounds comprising three or more (meth)acrylate functional groups per molecule.

According to certain embodiments, such compounds may contain three, four, five or six (meth)acrylate functional groups per molecule. In other embodiments, all of the (meth)acrylate functional groups are acrylate functional groups; i.e., the curable composition may optionally comprise one or more acrylate-functionalized compounds comprising three or more acrylate functional groups per molecule.

The (meth)acrylate-functionalized compounds comprising three or more (meth)acrylate functional groups per molecule may be (meth)acrylate esters of polyols (polyhydric alcohols) containing three or more hydroxyl groups per molecule, provided that at least three of the hydroxyl groups are (meth)acrylated.

Specific examples of suitable polyols include glycerin, alkoxylated glycerin, trimethylolpropane, alkoxylated trimethylolpropane, ditrimethylolpropane, alkoxylated ditrimethylolpropane, pentaerythritol, alkoxylated pentaerythritol, dipentaerythritol, alkoxylated dipentaerythritol, sugar alcohols and alkoxylated sugar alcohols. Such polyols may be fully or partially esterified (with (meth)acrylic acid, (meth)acrylic anhydride, (meth)acryloyl chloride or the like), provided the product obtained therefrom contains at least three (meth)acrylate functional groups per molecule. As used herein, the term "alkoxylated" refers to compounds in which one or more epoxides such as ethylene oxide and/or propylene oxide have been reacted with active hydrogen-containing groups (e.g., hydroxyl groups) of a base compound, such as a polyol, to form one or more oxyalkylene moieties. For example, from 1 to 25 moles of epoxide may be reacted per mole of base compound.

Exemplary (meth)acrylate-functionalized compounds containing three or more (meth)acrylate functional groups per molecule may include trimethylolpropane triacrylate; propoxylated trimethylolpropane triacrylate; ethoxylated trimethylolpropane triacrylate; tris(2-hydroxyethyl) isocyanurate triacrylate; pentaerythritol triacrylate; ethoxylated pentaerythritol triacrylate; propoxylated pentaerythritol triacrylate, glyceryl triacrylate, ethoxylated glyceryl triacrylate, propoxylated glyceryl triacrylate; di-trimethylolpropane tetraacrylate; ethoxylated di-trimethylolpropane tetraacrylate; propoxylated di-trimethylolpropane tetraacrylate; pentaerythritol tetraacrylate; ethoxylated pentaerythritol tetraacrylate; propoxylated pentaerythritol tetraacrylate; dipentaerythritol pentaacrylate; ethoxylated dipentaerythritol pentaacrylate; propoxylated dipentaerythritol pentaacrylate; and combinations thereof.

Specific illustrative examples of suitable (meth)acrylate-functionalized compounds comprising three or more (meth)acrylate functional groups per molecule include ethoxylated pentaerythritol tetraacrylate.

Comonomer Compounds

The curable compositions of the present invention are optionally comprised of one or more comonomers which may be generally characterized as compounds containing a reactive carbon-carbon double bond (i.e., a site of ethylenic unsaturation) wherein one of the carbon atoms involved in the carbon-carbon double bond is substituted by two C=O (carbonyl) containing groups, wherein such carbon atom of the carbon-carbon double bond is directly bonded to the carbon atom of the C=O moiety in each of the two C=O containing groups or directly bonded to the carbon atom of the C=O moiety in one of the two C=O containing groups and indirectly bonded to the carbon atom of the C=O moiety in the other C=O containing group through an intermediate —CH$_2$— group (resulting in the moiety C=C—CH$_2$—C(=O)—). The other carbon atom involved in the carbon-carbon double bond is either unsubstituted (resulting in a terminal methylene group, C=CH$_2$) or substituted with a $C_1$ or $C_2$ alkyl group (resulting in an alkene group $C=CHCH_3$ or $C=CCH_2CH_3$).

Optional reactive comonomers useful in the present invention may have the general structure $R^aR^bC=CHR^c$, wherein $R^a$ and $R^b$ are the same as or different from each other and are selected from —C(=O)$XR^d$, —CH$_2$C(=O)$XR^e$, and —C(=O)$R^f$, subject to the proviso that $R^a$ and $R^b$ are not both —CH$_2$C(=O)$XR^e$; wherein each X is independently O or $NR^i$, with each $R^i$ being independently selected from H or an organic group, wherein each $R^d$ and $R^e$ is independently selected from H, alkali metal, or an organic group (wherein the organic group can be, for example, an alkyl group, an alkenyl group, an cycloalkyl group, a heterocyclyl group, an alkyl heterocyclyl group, an aryl group, an aralkyl group, an alkaryl group, a heteroaryl group, an alkheteroaryl group or a polyoxyalkylene group); and wherein each $R^f$ is independently selected from an organic group (such as an alkyl group, an alkenyl group, an cycloalkyl group, a heterocyclyl group, an alkyl heterocyclyl group, an aryl group, an aralkyl group, an alkaryl group, a heteroaryl group, an alkheteroaryl group, an oxyalkylene or a polyoxyalkylene group); or wherein two of $R^d$, $R^e$ or $R^f$ are taken together with the atoms to which they are bound to form a ring. When $R^d$, $R^e$ or $R^f$ is an alkyl group, an alkenyl group, an cycloalkyl group, a heterocyclyl group, an alkyl heterocyclyl group, an aryl group, an aralkyl group, an alkaryl group, a heteroaryl group, an alkheteroaryl group or a polyoxyalkylene group, such group may be substituted by one or more substituents. Any of the substituents known in the field of organic chemistry may be present, including, for example, halo, nitro, cyano, alkoxy, hydroxy and the like and combinations thereof, provided that such substituent(s) does not interfere with the ability of the comonomer to co-cure with the (meth)acrylate-functionalized compound(s).

Suitable types of optional reactive comonomers useful in the present invention include, but are not limited to, 1,1-diester-1-alkenes, 1,1-diketo-1-alkenes, 1-ester-1-keto-1-alkenes, 1,1-diamide-1-alkenes, 1-amide-1-keto-1-alkenes, 1-amide-1-ester-1-alkenes and/or icatonates. The comonomer(s) may, in certain aspects of the invention, be selected from the group consisting of methylene malonates (which may be considered a type of 1,1-diester-1-alkene), methylene acetyl acetonates (which may be considered a type of 1-ester-1-keto-1-alkene), methylene beta-diketones (which may be considered a type of 1,1-diketo-1-alkene), and itaconates. In one embodiment of the invention, only one type of reactive comonomer is present in the curable composition. In such an embodiment, the curable composition may contain only a single particular compound as the comonomer component. However, it is also possible for the curable composition to contain, as the comonomer component, a combination of two or more comonomer compounds of the same type (for example, two or more particular methylene malonate compounds). In other embodiments, the curable composition comprises two or more types of reactive comonomers (for example, both a methylene malonate and a methylene beta-diketone).

The terminal methylene-containing compounds are characterized by containing at least one methylene (=CH$_2$) group per molecule, wherein the carbon atom to which such methylene group is attached is substituted, for example, by two ester groups (—C(=O)OR), by two ketone groups (—C(=O)R) or by both an ester group and a ketone group, wherein R is an organic group such as alkyl or cycloalkyl (as will be explained in more detail subsequently).

According to certain aspects of the invention, one or more methylene malonates are present in the curable composition which have a structure (I):

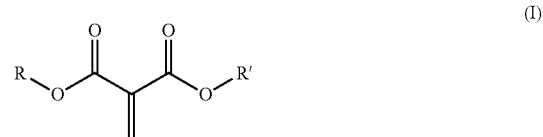

wherein R and R' are independently $C_1$-$C_{15}$ alkyl, $C_2$-$C_{15}$ alkenyl, halo-($C_1$-$C_{15}$ alkyl), $C_3$-$C_{12}$ cycloalkyl, halo-($C_3$-$C_{12}$ cycloalkyl), heterocyclyl, heterocyclyl-($C_1$-$C_{15}$ alkyl), aryl, aryl-($C_1$-$C_{15}$ alkyl), heteroaryl, heteroaryl-($C_1$-$C_{15}$ alkyl), or alkoxy-($C_1$-$C_{15}$ alkyl), each of which may be optionally substituted by $C_1$-$C_{15}$ alkyl, halo-($C_1$-$C_{15}$ alkyl), $C_3$-$C_{12}$ cycloalkyl, halo-($C_3$-$C_{12}$ cycloalkyl), heterocyclyl, heterocyclyl-($C_1$-$C_{15}$ alkyl), aryl, aryl-($C_1$-$C_{15}$ alkyl), heteroaryl, $C_1$-$C_{15}$ alkoxy, $C_1$-$C_{15}$ alkylthio, halo, hydroxyl, nitro, azido, cyano, acyloxy, carboxy, or ester; or wherein R and R' are taken together with the atoms to which they are bound to form a 5-7 membered heterocyclic ring which may be optionally substituted by $C_1$-$C_{15}$ alkyl, halo-($C_1$-$C_{15}$ alkyl), $C_3$-$C_{12}$ cycloalkyl, halo-($C_3$-$C_{12}$ cycloalkyl), heterocyclyl, heterocyclyl-($C_1$-$C_{15}$ alkyl), aryl, aryl-($C_1$-$C_{15}$ alkyl), heteroaryl, $C_1$-$C_{15}$ alkoxy, $C_1$-$C_{15}$ alkylthio, halo, hydroxyl, nitro, azido, cyano, acyloxy, carboxy, or ester.

In one embodiment of the invention, the curable composition is comprised of at least one methylene malonate of structure (I) wherein one or both of R and R' is a cycloalkyl group or contains a cycloalkyl group, which may be substituted or unsubstituted. Where both R and R' are cycloalkyl groups or contain cycloalkyl groups, the cycloalkyl groups may be the same as or different from each other. The cycloalkyl group may be directly bonded to the oxygen atom of an ester group or indirectly bonded to such oxygen atom (through, for example, an alkylene group, such as —CH$_2$—).

The cycloalkyl group may be a monocyclic alkyl group (substituted or unsubstituted), such as a cyclopentyl, cyclohexyl or cycloheptyl group, or a polycyclic alkyl group (substituted or unsubstituted), such as an isobornyl group or tricyclodecyl group. Suitable polycyclic alkyl groups include polycyclic alkyl groups having a fused ring system, polycyclic alkyl groups having a bridged ring system, as well as polycyclic alkyl groups having both a fused ring system and a bridged ring system.

Illustrative, non-limiting examples of methylene beta-diketones useful as optional comonomers in the curable compositions of the present invention include compounds wherein R and R' in the above-mentioned structure (I) are as follows:
R=t-butyl, R'=methyl;
R=R'=ethyl;
R=isopropyl, R'=methyl;
R=phenyl, R'=methyl;
R=R'=phenyl;
R=R'=n-propyl;
R=2-thiophene, R'=trifluoromethyl;
R=t-butyl; R'=trifluoromethyl;
R=n-hexyl, R'=trifluoromethyl;
R=R'=isopropyl;
R=methyl, R'=bromomethyl;
R=2-furanyl, R'=trifluoromethyl;
R=n-propyl, R'=trifluoromethyl;

R=ethyl, R'=trifluoromethyl;
R=methyl, R'=dichloromethyl;
R=phenyl, R'=difluoromethyl;
R=R'=chloromethyl;
R=methyl, R'=difluoromethyl;
R=methyl, R'=chlorodifluoromethyl;
R=methyl, R'=dichloromethyl;
R=4-chlorophenyl, R'=difluoromethyl;
R=methyl, R'=chloromethyl;
R=2,4-dichlorophenyl, R'=trifluoromethyl;
R=2,4-dimethoxyphenyl, R'=methyl;
R=R'=isobornyl;
R=R'=cyclohexyl;
R=ethyl, R'=isobornyl;
R=ethyl, R'=cyclohexyl; and
R=4-methoxyphenyl, R'=methyl.

Particular illustrative methylene malonates include, but are not limited to, the following compounds: diethyl methylene malonate (R=R'=ethyl), di-n-hexyl methylene malonate (R=R'=n-hexyl, di-isobornyl methylene malonate (R=R'=isobornyl), ethyl isobornyl methylene malonate (R=ethyl, R'=isobornyl) and dicyclohexyl methylene malonate (R=R'=cyclohexyl).

Methylene malonate monomers are well known in the art and are described, together with methods for their synthesis, in the following exemplary patent documents, the entire disclosure of each of which is incorporated herein by reference for all purposes: U.S. Pat. Nos. 2,313,501; 2,330,033; 3,221,745; 3,523,097; 3,557,185; 3,758,550; 3,975,422; 4,049,698; 4,056,543; 4,160,864; 4,931,584; 5,142,098; 5,550,172; 6,106,807; 6,211,273; 6,245,933; 6,420,468; 6,440,461; 6,512,023; 6,610,078; 6,699,928; 6,750,298; and 8,609,885; U.S. Patent Publication No. 2004/0076601; and International Patent Publication Nos. WO/2012/054616A2 and WO2012/054633A2.

In one aspect, the curable composition comprises one or more methylene beta-diketone monomers which have a structure (II):

wherein $R_1$ and $R_2$ are independently $C_1$-$C_{15}$ alkyl, $C_2$-$C_{15}$ alkenyl, halo-($C_1$-$C_{15}$ alkyl), $C_3$-$C_{12}$ cycloalkyl, halo-($C_3$-$C_{12}$ cycloalkyl), heterocyclyl, heterocyclyl-($C_1$-$C_{15}$ alkyl), aryl, aryl-($C_1$-$C_{15}$ alkyl), heteroaryl or heteroaryl-($C_1$-$C_{15}$ alkyl), or alkoxy-($C_1$-$C_{15}$ alkyl), each of which may be optionally substituted by $C_1$-$C_{15}$ alkyl, halo-($C_1$-$C_{15}$ alkyl), $C_3$-$C_{12}$ cycloalkyl, halo-($C_3$-$C_{12}$ cycloalkyl), heterocyclyl, heterocyclyl-($C_1$-$C_{15}$ alkyl), aryl, aryl-($C_1$-$C_{15}$ alkyl), heteroaryl, $C_1$-$C_{15}$ alkoxy, $C_1$-$C_{15}$ alkylthio, halo, hydroxyl, nitro, azido, cyano, acyloxy, carboxy, or ester;
or
wherein $R_1$ and $R^2$ are taken together with the atoms to which they are bound to form a 5-7 membered heterocyclic ring which may be optionally substituted by $C_1$-$C_{15}$ alkyl, halo-($C_1$-$C_{15}$ alkyl), $C_3$-$C_{12}$ cycloalkyl, halo-($C_3$-$C_{12}$ cycloalkyl), heterocyclyl, heterocyclyl-($C_1$-$C_{15}$ alkyl), aryl, aryl-($C_1$-$C_{15}$ alkyl), heteroaryl, $C_1$-$C_{15}$ alkoxy, $C_1$-$C_{15}$ alkylthio, halo, hydroxyl, nitro, azido, cyano, acyloxy, carboxy, or ester.

Illustrative, non-limiting examples of methylene beta-diketones useful as co-monomers in the curable compositions of the present invention include compounds wherein $R_1$ and $R_2$ in the above-mentioned structure (II) are as follows:
$R_1$=t-butyl, $R_2$=methyl;
$R_1$=$R_2$=ethyl;
$R_1$=isopropyl, $R_2$=methyl;
$R_1$=phenyl, $R_2$=methyl;
$R_1$=$R_2$=phenyl;
$R_1$=$R_2$=n-propyl;
$R_1$=2-thiophene, $R_2$=trifluoromethyl;
$R_1$=t-butyl; $R_2$=trifluoromethyl;
$R_1$=n-hexyl, $R_2$=trifluoromethyl;
$R_1$=$R_2$=isopropyl;
$R_1$=methyl, $R_2$=bromomethyl;
$R_1$=2-furanyl, $R_2$=trifluoromethyl;
$R_1$=n-propyl, $R_2$=trifluoromethyl;
$R_1$=ethyl, $R_2$=trifluoromethyl;
$R_1$=methyl, $R_2$=dichloromethyl;
$R_1$=phenyl, $R_2$=difluoromethyl;
$R_1$=$R_2$=chloromethyl;
$R_1$=methyl, $R_2$=difluoromethyl;
$R_1$=methyl, $R_2$=chlorodifluoromethyl;
$R_1$=methyl, $R_2$=dichloromethyl;
$R_1$=4-chlorophenyl, $R_2$=difluoromethyl;
$R_1$=methyl, $R_2$=chloromethyl;
$R_1$=2,4-dichlorophenyl, $R_2$=trifluoromethyl;
$R_1$=2,4-dimethoxyphenyl, $R_2$=methyl;
$R_1$=$R_2$=isobornyl;
$R_1$=$R_2$=cyclohexyl;
$R_1$=ethyl, $R_2$=isobornyl;
$R_1$=ethyl, $R_2$=cyclohexyl; and
$R_1$=4-methoxyphenyl, $R_2$=methyl.

Methods of making such methylene beta-diketone compounds are known in the art, including the methods described in US 2014/0275400 A1 (the entire disclosure of which is incorporated herein by reference in its entirety for all purposes).

A further type of optional reactive comonomer that can be used in the curable compositions of the present invention are compounds of the aforementioned structure $R^aR^bC$=$CHR^c$ in which $R^a$ is —C(=O)$OR^d$, $R^b$ is —C(=O)$R^f$ and $R^c$ is H, methyl or ethyl. Such compounds may be referred to alkene beta-ketoesters or 1-ester-1-keto-1-alkenes or, where $R^c$ is H, as methylene beta-ketoesters or methylene acetyl acetonates. Compounds of this type are known in the art and are described, for example, in US 2014/0288230, the disclosure of which is incorporated herein by reference in its entirety for all purposes. Particular illustrative examples of methylene beta-ketoesters suitable for use in the present invention include, but are not limited to, compounds of structure $R^aR^bC$=$CHR^c$ in which $R^c$ is H, $R^a$ is —C(=O)$OR^d$ and $R^b$ is —C(=O)$R^f$ and $R^d$ and $R^f$ are as follows:
$R^d$=methyl, $R^f$=t-butyl;
$R^d$=ethyl, $R^f$=phenyl;
$R^d$=ethyl, $R^f$=n-propyl;
$R^d$=ethyl, $R^f$=methyl;
$R^d$=$R^f$=methyl;
$R^d$=ethyl, $R^f$=isopropyl;
$R^d$=$R^f$=ethyl;
$R^d$=$R^f$=cyclohexyl;
$R^d$=$R^f$=isobornyl;
$R^d$=isobornyl, $R^f$=ethyl;
$R^d$=cyclohexyl, $R^f$=ethyl;
$R^d$=ethyl, $R^f$=benzyl;
$R^d$=ethyl, $R^f$=chloromethyl;

$R^d$=ethyl, $R^f$=thiophene;
$R^d$=ethyl, $R^f$=furanyl;
$R^d$=methyl, $R^f$=chloromethyl;
$R^d$=cyclopentylmethyl, $R^f$=phenyl;
$R^d$=ethyl, $R^f$=difluoromethyl;
$R^d$=tetrahydrofuranylmethyl, $R^f$=phenyl;
$R^d$=ethyl, $R^f$=1-bromo-ethyl;
$R^d$=ethyl, $R^f$=cyclohexyl;
$R^d$=isopropyl, $R^f$=chloromethyl;
$R^d$=ethyl, $R^f$=cyclopentyl;
$R^d$=2-methoxyethyl, $R^f$=methyl;
$R^d$=—$CH_2CH_2OC$(=O)$CH_3$, $R^f$=methyl;
$R^d$=furanylmethyl, $R^f$=methyl; and
$R^d$=benzyl, $R^f$=methyl.

The curable compositions of the present invention may optionally comprise one or more itaconates. An itaconate or a combination of two or more different itaconates may be utilized by itself or themselves as the reactive comonomer component of the curable composition. However, in other embodiments, one or more itaconates may be present in combination with one or more other types of reactive comonomers as the reactive comonomer component of the curable composition (e.g., one or more itaconates+one or more methylene malonates). Itaconates may be characterized as diesters of itaconic acid, which has the structure HOC(=O)$CH_2C$(=$CH_2$)C(=O)OH. Suitable itaconates may correspond to the structure $R^gOC$(=O)$CH_2C$(=$CH_2$)C(=O)$OR^h$, wherein $R^g$ and $R^h$ are organic groups which the same as or different from each other. Suitable organic groups include alkyl groups, alkenyl groups, cycloalkyl groups, heterocyclyl groups, alkyl heterocyclyl groups, aryl groups, aralkyl groups, alkaryl groups, heteroaryl groups, alkheteroaryl groups, oxyalkylene groups and polyoxyalkylene groups, which may be substituted or unsubstituted. For example, $R^g$ and $R^h$ may be independently selected from $C_1$-$C_{15}$ alkyl, $C_2$-$C_{15}$ alkenyl, halo-($C_1$-$C_{15}$ alkyl), $C_3$-$C_{12}$ cycloalkyl, halo-($C_3$-$C_{12}$ cycloalkyl), heterocyclyl, heterocyclyl-($C_1$-$C_{15}$ alkyl), aryl, aryl-($C_1$-$C_{15}$ alkyl), heteroaryl or heteroaryl-($C_1$-$C_{15}$ alkyl), or alkoxy-($C_1$-$C_{15}$ alkyl), each of which may be optionally substituted by, for example, $C_1$-$C_{15}$ alkyl, halo-($C_1$-$C_{15}$ alkyl), $C_3$-$C_{12}$ cycloalkyl, halo-($C_3$-$C_{12}$ cycloalkyl), heterocyclyl, heterocyclyl-($C_1$-$C_{15}$ alkyl), aryl, aryl-($C_1$-$C_{15}$ alkyl), heteroaryl, $C_1$-$C_{15}$ alkoxy, $C_1$-$C_{15}$ alkylthio, halo, hydroxyl, nitro, azido, cyano, acyloxy, carboxy, or ester. Particular examples of suitable $R^g$ and $R^h$ groups include, but are not limited to, methyl, ethyl, n-propyl, isopropyl, n-butyl, t-butyl, cyclopentyl, cyclohexyl, cyclohexylmethyl (Cyc-$CH_2$—, where Cyc=cyclohexyl), phenyl, benzyl, 2-phenylethyl and isobornyl.

Illustrative, non-limiting examples of suitable itaconates include dimethyl itaconate, diethyl itaconate, di-n-butyl itaconate, di-isobutyl itaconate, dicyclohexyl itaconate, alkyl poly(oxyethylene) itaconates, bis(hexafluoroisopropyl) itaconate, diphenyl itaconate, dibenzyl itaconate, ethyl isobornyl itaconate, ethyl cyclohexyl itaconate and the like and combinations thereof.

Examples of preferred comonomer compounds for use in the curable compositions of the present invention include, but are not limited to, dicyclohexyl methylene malonate, di-isobornyl methylene malonate, ethyl isobornyl methylene malonate, dihexyl methylene malonate and diethyl methylene malonate.

The amount of the above-described optional comonomer compound present in the curable compositions may be varied as may be desired to impart certain characteristics to the curable composition and/or to achieve certain properties in the cured materials prepared therefrom. According to certain embodiments, the curable composition does not contain any such comonomer compound. In other embodiments, the curable composition may comprise at least 0.5, at least 1, at least 2 or at least 5 percent by weight of such a comonomer compound or mixture of comonomer compounds, based on the total weight of the curable composition. According to other embodiments, the curable composition may comprise not more than 30, not more than 25, not more than 20 or not more than 15 percent by weight of such a comonomer compound or mixture of comonomer compounds, based on the total weight of the curable composition. For example, the curable composition may comprise 1 to 25 percent by weight or 5 to 20 percent by weight of such a comonomer compound or mixture of comonomer compounds, based on the total weight of the curable composition.

According to certain embodiments of the invention, the curable composition is comprised of at least one oligomer (in particular, at least one acrylate-terminated oligomer corresponding to oligomers xii) through xxiv) as described elsewhere herein), at least one high Tg monofunctional monomer and at least one low Tg monofunctional monomer. Other components, including in particular at least one tackifier and/or at least one initiator system and/or up to 4% by weight of at least one (meth)acrylate-functionalized compound comprising three or more (meth)acrylate functional groups per molecule, may optionally also be present in such a curable composition. Such a curable composition may be polymerized to provide a non-sensitizing pressure sensitive adhesive.

As used herein, "high Tg monofunctional monomer" refers to a monofunctional monomer that when homopolymerized produces a polymer having a glass transition temperature (as measured by differential scanning calorimetry) of greater than 25° C. and "low Tg monofunctional monomer" refers to a monofunctional monomer that when homopolymerized produces a polymer having a glass transition temperature (as measured by differential scanning calorimetry) of less than 25° C. The term "monofunctional monomer" refers to a monomeric compound that contains a single polymerizable functional group, e.g., a carbon-carbon double bond (as provided, for example, by an acrylate group or the C=C functionality present in the comonomer compounds described herein).

The high Tg monofunctional monomer may, for example, produce a polymer when homopolymerized having a Tg of at least 40° C., at least 50° C., at least 60° C., at least 70° C., or at least 75° C. The low Tg monofunctional monomer may, for example, produce a polymer when homopolymerized having a Tg of not more than 10° C., not more than 0° C., not more than −10° C., not more than −20° C., or not more than −25° C. In certain embodiments, the difference in such glass transition temperature (i.e., the difference between the Tg of the high Tg monofunctional monomer when homopolymerized and the Tg of the low Tg monofunctional monomer) is at least 50° C., at least 60° C., at least 70° C., at least 80° C., at least 90° C. or at least 100° C.

The relative amounts of the high and low Tg monofunctional monomers in the curable composition may be varied as may be desired depending upon, for example, the properties of the oligomer(s) also present in the curable composition and the combination of properties (e.g., peel strength, shear, and tack) desired in the cured composition obtained from the curable composition. Generally speaking, however, the mass ratio of high Tg monofunctional monomer(s) to low Tg monofunctional monomer(s) in the curable composition may suitably be from 1:10 to 10:1, from 1:5 to 5:1, from 1:4 to 4:1, from 1:3 to 3:1, or from 1:2 to 2:1.

Dicyclohexyl methylene malonate is an example of a suitable high Tg monofunctional monomer. Examples of suitable low Tg monofunctional monomers include acrylates of ethoxylated phenols containing 3 to 5 oxyethylene units per molecule; acrylates of propoxylated nonyl phenols containing 1 to 4 oxypropylene units per molecule; 6-methyl-1-heptanol acrylate; isooctyl acrylate; acrylates of methoxy polyethylene glycols, wherein the methoxy polyethylene glycols have a number average molecular weight of 300 to 600 g/mol; and acrylates of propoxylated tetrahydro-2-furanmethanols containing 1 to 3 oxypropylene units per molecule;

In certain embodiments of the invention, the mass ratio of oligomer(s) to high Tg monofunctional monomer(s)+low Tg monofunctional monomer(s) in the curable composition may suitably be from 1:5 to 5:1, from 1:4 to 4:1, from 1:3 to 3:1, or from 1:2 to 2:1.

Photoinitiator

In certain embodiments, the curable compositions include at least one photoinitiator and are curable with UV and/or visible light. Any of the photoinitiators known in the art of actinic radiation-curable acrylates may be utilized in the present invention, such as, for example, α-hydroxyketones, phenylglyoxylates, benzyldimethylketals, α-aminoketones, mono-acyl phosphines, bis-acyl phosphines, phosphine oxides, metallocenes and combinations thereof.

Specific exemplary photoinitiators suitable for use in the present invention include: camphor quinone (CQ), phenylbis (2,4,6-trimethylbenzoyl)phosphine oxide (BAPO), and diphenyl(2,4,6-trimethylbenzoyl)phosphine oxide (TPO).

If photoinitiator is present in the curable composition, typical concentrations are up to about 15% by weight based on the total weight of the curable composition. For example the curable composition may comprise from 0.5 to 10% by weight, in total, of photoinitiator, based on the total weight of the curable composition.

Because unreacted photoinitiator and/or residues derived from the photoinitiator may be present in the composition after curing, the photoinitiator(s) should be selected such that, once cured, the resulting product (whether a pressure sensitive adhesive or a non-tacky film) passes an in vitro cytotoxicity test as measured in accordance with ISO 10993-5 (2009).

Tackifier

In certain embodiments of the invention, the curable composition used to prepare a non-sensitizing pressure sensitive adhesive may optionally include one or more tackifiers. In the context of the present invention, tackifiers are non-reactive (i.e., non-energy-curable) substances which increase the tackiness of an energy-cured product. However, in other embodiments, the curable composition does not contain tackifier. For example, if the curable composition is to be used to prepare a non-tacky film, it typically will not comprise any tackifier. However, in the case where the curable composition is a precursor to a pressure sensitive adhesive, the reactive components of such curable composition may be selected such that the use of a tackifier is not needed in order to render the cured product obtained therefrom pressure sensitive and tacky.

If a tackifier is to be employed, it may be any of the tackifiers known in the adhesive art, such as aliphatic hydrocarbon tackifiers (including alicyclic hydrocarbon tackifiers), mixed hydrocarbon tackifiers, aromatic hydrocarbon tackifiers, terpene tackifiers, rosin ester tackifiers (such as tall oil rosin esters) and the like and combinations thereof. In certain embodiments, the at least one tackifier is hydrogenated. For example, suitable tackifiers may be selected from the group consisting of hydrogenated and non-hydrogenated piperylene-based hydrocarbon resins, hydrogenated and non-hydrogenated rosin esters, and maleic anhydride-modified rosin esters. In certain embodiments, the at least one tackifier has a softening temperature of 80° C. or less, e.g., 70° C. or less, 60° C. or less, 50° C. or less or 40° C. or less, as measured by Ring and Ball Softening Point (RBSP), ASTM D6493-11 (2015).

If a tackifier is included in the curable composition, it should of course be selected such that when cured the resulting product obtained from the curable composition passes an in vitro cytotoxicity test as measured in accordance with ISO 10993-5 (2009). That is, tackifiers should not be used which potentially could lead to skin sensitization issues in the cured product.

An amount of tackifier may be used which is effective to impart the desired properties to the curable composition and the cured product obtained therefrom. Generally speaking, the curable composition may comprise up to 50% by weight or up to 35% by weight tackifier, based on the total weight of the curable composition. According to certain embodiments, the curable composition is comprised of at least 1% by weight tackifier, or between 1% to 20% by weight tackifier, based on the total weight of the curable composition.

Suitable tackifiers which may be obtained from commercial sources include, for example, Sylvatac® RE 25 (Arizona Chemical), Sylvatac® RE 40 (Arizona Chemical), Sylvalite® RE 10L (Arizona Chemical), Sylvalite® 80HP (Arizona Chemical), Teckros® HRL (Teckrez) and Teckros® RL5 (Teckrez).

Other Additives

Depending upon the particular intended end-use application and the desired properties of the curable composition and cured product, one or more other additives may optionally be present in the curable composition. Such additives may, for example, be selected from the group consisting of wetting agents, matting agents, colorants, dyes, pigments, adhesion promoters, fillers, rheology modifiers, thixotropic agents, plasticizers, UV absorbers, UV stabilizing agents, dispersants, antioxidants, antistatic agents, lubricants, opacifying agents, anti-foam agents, rheology agents and combinations thereof. However, if such additives are included in the curable composition, they should be additives which do not interfere with the production of cured products from the curable composition which pass an in vitro cytotoxicity test as measured in accordance with ISO 10993-5 (2009). That is, additives should not be used which potentially could lead to skin sensitization issues in the cured product.

Preparation of and Uses for the Curable Compositions

The curable compositions of the present invention may be readily prepared by simply combining the desired components in the desired relative amounts and blending the resulting mixture to obtain a homogeneous composition. The components may be combined in any order or sequence; typically, such mixing may be carried out at room temperature or at a somewhat elevated temperature (e.g., up to 70° C.) for reasons such as lowering viscosity, facilitating the mixing, and/or helping to dissolve or melt solid components.

According to certain embodiments, a method of coating a substrate is provided which may comprise applying a layer of the curable composition to a substrate and curing the curable composition layer. For example, the curable composition may be applied at ambient temperature (e.g., 10° C. to 40° C.). The substrate may be a high surface energy substrate, such as a metal substrate, or a low surface energy substrate, such as a plastic substrate. The curable composition may, for example, be applied to a substrate by any suitable method such as spraying, knife coating, roller coating, inkjet printing, screen printing, casting, drum coating, dipping and the like and combinations thereof. According to certain embodiments, the curing may comprise curing by exposure of the curable composition disposed on the substrate to one of the group consisting of visible radiation, ultraviolet (UV) radiation, light emitting diode (LED) radiation, laser radiation, electron-beam (EB) radiation, and combinations thereof.

Possible exposure times may range, for example, from 0.001 seconds to 5 minutes, e.g., from 0.1 to 10 seconds.

The layer of curable composition formed on a substrate surface may be any suitable or desired thickness such as, for example, 10 to 200 microns or 25 to 100 microns. According to certain aspects, a pressure sensitive adhesive film is obtained by depositing a single layer of a non-sensitizing energy-curable pressure sensitive adhesive formulation in accordance with aspects of the present invention on a substrate surface and curing the single layer by exposing the layer to a suitable energy source. In other embodiments, however, a plurality of such pressure sensitive adhesive layers may be built up on a substrate surface by applying and energy-curing successive layers of non-sensitizing energy-curable pressure sensitive adhesive formulation in accordance with the invention. Such procedures may also be employed with the non-sensitizing energy-curable non-adhesive formulations described herein.

In one embodiment, the curable composition which is coated onto a substrate as a layer and then energy-cured is a non-sensitizing energy-curable pressure sensitive adhesive formulation in accordance with aspects of the present invention. The cured film will be a pressure sensitive adhesive that passes ISO 10993-5 (2009).

In another embodiment, the curable composition which is coated onto a substrate (which may be a release liner) as a layer and then energy-cured is a non-sensitizing energy-curable non-adhesive formulation in accordance with aspects of the present invention. The cured film will be a non-tacky film that passes ISO 10993-5 (2009), which may be left in place on the substrate or removed from the substrate (as in the case where the substrate is a release liner). Such a non-tacky film can be used as a base for depositing and energy-curing a layer of a non-sensitizing energy-curable pressure sensitive adhesive formulation in accordance with aspects of the present invention. The release liner may be constructed of any of the materials known in the art to have suitable release properties, such as siliconized papers and films.

According to one aspect of the present invention, a layer of a non-sensitizing pressure sensitive adhesive may be formed on a substrate surface (such as the surface of a supportive substrate) using a non-sensitizing energy-curable pressure sensitive adhesive formulation in accordance with the present invention, with the non-sensitizing pressure sensitive adhesive layer then being covered by a release liner for reasons such as to protect the layer from contamination and/or to maintain sterility until such time that it is desired to apply the article to a substrate (such as human skin), whereby the article adheres to a surface of the substrate by means of the adhesive layer. An article comprising a non-sensitizing pressure sensitive adhesive in accordance with the invention may be subjected to a sterilization process, such as any of the sterilization procedures known in the art.

Embodiments of the non-sensitizing energy-curable pressure sensitive adhesive formulations described herein are capable of forming smooth, uniform coatings or films without the application of heat, whereby the coatings or films have advantageous properties with respect to peel strength, tack and shear resistance and are non-sensitizing towards skin (i.e., pass an in vitro cytotoxicity test conducted in accordance with ISO 10993-5 (2009)). Embodiments of the non-sensitizing energy-curable pressure sensitive adhesive formulations and the non-sensitizing pressure sensitive adhesives obtained therefrom and described herein may find use as adhesive tapes, adhesive sheets or adhesive sprays and may find other use in product packaging and labeling, construction and medicine.

In particular, the non-sensitizing energy-curable pressure sensitive adhesive formulations of the present invention are especially useful for producing articles comprising a pressure sensitive adhesive which is intended, when in use, to be brought into contact with mammalian (e.g., human) skin, either for brief periods of time or for extended (prolonged) periods of time. Such articles may, for example, be medical articles or devices, including but not limited to drug delivery systems (such as transdermal patches and other dermal dosage systems), biomedical electrodes (i.e., electrodes for establishing an electrical connection between the skin of a subject and an electromedical apparatus), medical adhesive tapes and sheets (which may, for example, be used to secure dressings and devices), adhesive bandages (e.g., self-sticking medicinal plasters and pads, including adhesive bandages containing a wound pad), surgical drapes, medical skin coverings, and the like, including sanitary products such as diapers, incontinence pads and feminine hygiene products in which incidental contact of a pressure sensitive adhesive with human skin might occur when the product is in use. The article may comprise a supportive substrate for a layer of a pressure sensitive adhesive obtained by energy-curing a layer of a non-sensitizing pressure sensitive adhesive formulation disposed on at least one surface of the supportive substrate. According to certain embodiments, the entirety of such surface of the supportive substrate is covered by the pressure sensitive adhesive layer. In other embodiments, only a portion or portions of the supportive substrate surface is or are covered by a layer of the pressure sensitive adhesive. Any of the materials known in the art may be used as the supportive substrate. According to certain embodiments, the supportive substrate is a non-tacky film obtained by energy-curing a non-sensitizing energy-curable non-adhesive formulation in accordance with aspects of the present invention. The supportive substrate may be thin, stretchable and/or flexible. According to certain embodiments, the supportive substrate is porous and/or moisture permeable (breathable). The supportive substrate may, for example, be in the form of a film or a fabric. Synthetic as well as natural materials may be utilized to fabricate the supportive substrate.

According to certain embodiments of the invention, one or more active pharmaceutical ingredients may be incorporated into the non-sensitizing pressure sensitive adhesive to provide an article capable of being used as a transdermal drug delivery stem.

Exemplary aspects of the present invention may be summarized as follows:

Aspect 1: A curable composition, comprising:
a) an acrylate-functionalized component comprising at least one acrylate-functionalized compound selected from the group consisting of:

i) acrylates of ethoxylated phenols containing 3 to 5 oxyethylene units per molecule;
ii) acrylates of propoxylated nonyl phenols containing 1 to 4 oxypropylene units per molecule;
iii) 6-methyl-1-heptanol acrylate or isooctyl acrylate;
iv) acrylates of methoxy polyethylene glycols, wherein the methoxy polyethylene glycols have a number average molecular weight of 300 to 600 g/mol;
v) tetraethylene glycol diacrylates;
vi) acrylates of propoxylated tetrahydro-2-furanmethanols containing 1 to 3 oxypropylene units per molecule;
vii) diacrylates of linear polybutadiene polymers, where the polymers are linear polybutadiene polymers with hydroxyl end groups;
viii) diacrylates of bisphenol A and ethoxylated bisphenol A containing 1 to 35 oxyethylene units per molecule;
ix) diacrylates of ethoxylated 1,6-hexanediols containing 1 to 6 oxyethylene units per molecule;
x) diacrylates of propoxylated 1,6-hexanediols containing 1 to 4 oxypropylene units per molecule;
xi) diacrylates of ethoxylated neopentyl glycols containing 1 to 3 oxyethylene units per molecule;
xii) acrylate-terminated oligomers obtainable by reaction of caprolactone acrylate with a polyisocyanate selected from the group consisting of dicyclohexylmethane diisocyanate, toluene diisocyanate, and hexamethylene diisocyanate biuret;
xiii) acrylate-terminated oligomers obtainable by reaction of 2-hydroxyethyl acrylate, isophorone diisocyanate and neopentyl glycol-co-adipic acid polyester polyol, the polyester polyol having a number average molecular weight of 400 to 2500 g/mol;
xiv) acrylate-terminated oligomers obtainable by reaction of 2-hydroxyethyl acrylate, a diisocyanate selected from toluene diisocyanate or isophorone diisocyanate, and polypropylene glycol, wherein the polypropylene glycol is a diol or triol and has a number average molecular weight of 800 to 5000 g/mol;
xv) acrylate-terminated oligomers obtainable by reaction of 2-hydroxyethyl acrylate, a diisocyanate selected from isophorone diisocyanate or dicyclohexylmethane diisocyanate, and polytetramethylene ether glycol, wherein the polytetramethylene glycol has a number average molecular weight of 500 to 1200 g/mol;
xvi) acrylate-terminated oligomers obtainable by reaction of 2-hydroxyethyl acrylate, toluene diisocyanate, and ethylene glycol-co-propylene glycol-co-adipic acid polyester polyol, wherein the polyester polyol has a number average molecular weight of 2500 to 3500 g/mol;
xvii) acrylate-terminated oligomers obtainable by reaction of 2-hydroxyethyl acrylate, a polyisocyanate selected from toluene diisocyanate or dicyclohexylmethane diisocyanate, and ethylene glycol-co-adipic acid polyester polyol, wherein the polyester polyol has a number average molecular weight of 500 to 1000 g/mol;
xviii) acrylate-terminated oligomers obtainable by reaction of 2-hydroxyethyl acrylate, isophorone diisocyanate, and hydroxyl-terminated polysiloxane/polyethylene oxide block copolymer, wherein the hydroxyl-terminated polysiloxane/polyethylene oxide block copolymer has a number average molecular weight of 1500 to 3000 g/mol;
xix) acrylate-terminated oligomers obtainable by reaction of acrylic acid and glycidyl ethers of bisphenol A;
xx) acrylate-terminated oligomers obtainable by reaction of acrylic acid, glycidyl ethers of bisphenol A, diethylene glycol, and phthalic anhydride;
xxi) acrylate-terminated oligomers obtainable by reaction of acrylic acid and glycidyl neodecanoate;
xxii) acrylate-terminated oligomers obtainable by reaction of 2-hydroxyethyl acrylate and hexamethylene diisocyanate biuret; and
xxiii) acrylate-terminated oligomers obtainable by reaction of acrylic acid and unsaturated fatty acid dimer diol; and
xxiv) acrylate-terminated oligomers obtainable by reaction of acrylic acid, toluene diisocyanate, and bisphenol A;

b) 0 to 5% by weight in total, based on the weight of the curable composition, of (meth)acrylate-functionalized compounds comprising three or more (meth)acrylate functional groups per molecule (meaning that the curable composition could, in certain embodiments, contain no (meth)acrylate-functionalized compounds comprising three or more (meth)acrylate functional groups per molecule, but in other embodiments could contain no more than 5% by weight, in total, of (meth)acrylate-functionalized compounds comprising three or more (meth)acrylate functional groups per molecule);

c) optionally, at least one comonomer having structure $R^a R^b C = CHR^c$, wherein $R^a$ and $R^b$ are the same as or different from each other and are selected from $-C(=O)XR^d$, $-CH_2C(=O)XR^e$, and $-C(=O)R^f$, subject to the proviso that $R^a$ and $R^b$ are not both $-CH_2C(=O)XR^e$; wherein each X is independently O or $NR^i$, with each $R^i$ being independently selected from H or an organic group, wherein each $R^d$ and $R^e$ is independently selected from H, alkali metal, or an organic group; and wherein each $R^f$ is an organic group; or wherein two of $R^d$, $R^e$ or $R^f$ are taken together with the atoms to which they are bound to form a ring;

d) optionally, at least one tackifier;
e) optionally, at least one initiator system;
f) optionally, at least one additive which is not a tackifier or part of an initiator system;

wherein:
the curable composition has a ratio of moles of methacrylate functional groups to moles of acrylate functional groups of 0:1 to 1:1; and
the curable composition, when cured, provides a pressure sensitive adhesive which passes an in vitro cytotoxicity test as measured in accordance with ISO 10993-5 (2009).

Aspect 2: The curable composition of Aspect 1, wherein the curable composition has a ratio of moles of methacrylate functional groups to moles of acrylate functional groups of 0:1 to 0.5:1; 0:1 to 0.2:1; 0:1 to 0.1:1; or 0:1 to 0.05:1.

Aspect 3: The curable composition of Aspect 1 or 2, wherein the curable composition, when cured, has a glass transition temperature of not more than 20° C., not more than 10° C., not more than 0° C., or not more than −10° C.

Aspect 4: The curable composition of any of Aspects 1 to 3, wherein acrylate-functionalized compounds i)-xxiv) comprise at least 80%, at least 85%, at least 90%, at least 95%, at least 99% or 100% by weight of the total weight of (meth)acrylate-functionalized compounds present in the curable composition.

Aspect 5: The curable composition of any of Aspects 1 to 4, wherein the curable composition comprises at least one of acrylate-functionalized compounds i)-xi) and at least one of acrylate-functionalized compounds xii)-xxiv).

Aspect 6: The curable composition of any of Aspects 1 to 4, wherein the curable composition comprises at least one of acrylate-functionalized compounds i)-xi) and at least one of acrylate-functionalized compounds xiii)-xviii).

Aspect 7: The curable composition of any of Aspects 1 to 4, wherein the curable composition comprises at least one acrylate-functionalized compound iii) and at least one acrylate-functionalized compound xiii).

Aspect 8: The curable composition of any of Aspects 1 to 4, wherein the curable composition comprises at least one acrylate-functionalized compound iii), at least one acrylate-functionalized compound xiii), and at least one comonomer c) selected from the group consisting of dicyclohexyl methylene malonate, di-isobornyl methylene malonate, ethyl isobornyl methylene malonate, dihexyl methylene malonate and diethyl methylene malonate.

Aspect 9: The curable composition of any of Aspects 1 to 8, wherein the curable composition comprises at least one initiator system and wherein the at least one initiator system comprises at least one photoinitiator.

Aspect 10: The curable composition of Aspect 9, wherein the at least one photoinitiator comprises at least one photoinitiator selected from the group consisting of α-hydroxyketones, phenylglyoxylates, benzyldimethylketals, α-aminoketones, mono-acyl phosphines, bis-acyl phosphines, phosphine oxides and metallocenes.

Aspect 11: The curable composition of any of Aspects 1 to 10, comprising 0 to 1% by weight in total, based on the weight of the curable composition, of methacrylate-functionalized compounds (meaning that the curable composition could, in certain embodiments, contain no methacrylate-functionalized compounds, but in other embodiments could contain no more than 1% by weight, in total, of methacrylate-functionalized compounds).

Aspect 12: The curable composition of any of Aspects 1 to 11, comprising 0 to 4% by weight in total, based on the weight of the curable composition, of acrylate-functionalized compounds comprising three or more acrylate functional groups per molecule (meaning that the curable composition could, in certain embodiments, contain no acrylate-functionalized compounds comprising three or more acrylate functional groups per molecule, but in other embodiments could contain no more than 4% by weight, in total, of acrylate-functionalized compounds comprising three or more acrylate functional groups per molecule.

Aspect 13: The curable composition of any of Aspects 1 to 12, comprising the at least one tackifier in an amount up to 35% by weight, based on the weight of the curable composition.

Aspect 14: The curable composition of Aspect 13, wherein the one or more tackifiers are selected from the group consisting of hydrogenated and non-hydrogenated piperylene-based hydrocarbon resins, hydrogenated and non-hydrogenated rosin esters, and maleic anhydride-modified rosin esters.

Aspect 15: The curable composition of any of Aspects 1 to 14, having a viscosity at 25° C. of not more than 10,000 cP, not more than 8000 cP or not more than 6000 cP.

Aspect 16: The curable composition of any of Aspects 1 to 15, wherein the curable composition additionally comprises one or more additives selected from the group consisting of wetting agents, matting agents, colorants, dyes, pigments, adhesion promoters, fillers, rheology modifiers, thixotropic agents, plasticizers, UV absorbers, UV stabilizing agents, dispersants, antioxidants, antistatic agents, lubricants, opacifying agents, anti-foam agents, and rheology agents.

Aspect 17: The curable composition of any of Aspects 1 to 16, wherein the curable composition comprises at least one of acrylate-functionalized compounds xiii)-xviii), at least one high Tg monofunctional monomer, and at least one low Tg monofunctional monomer.

Aspect 18: The curable composition of Aspect 17, wherein the at least one high Tg monofunctional monomer includes at least one comonomer having structure $R^a R^b C = CHR^c$, wherein $R^a$ and $R^b$ are the same as or different from each other and are selected from $—C(=O)XR^d$, $—CH_2C(=O)XR^e$, and $—C(=O)R^f$, subject to the proviso that $R^a$ and $R^b$ are not both $—CH_2C(=O)XR^e$; wherein each X is independently O or $NR^i$, with each $R^i$ being independently selected from H or an organic group, wherein each $R^d$ and $R^e$ is independently selected from H, alkali metal, or an organic group; and wherein each $R^f$ is an organic group; or wherein two of $R^d$, $R^e$ or $R^f$ are taken together with the atoms to which they are bound to form a ring.

Aspect 19: The curable composition of Aspect 17 or Aspect 18, wherein the at least one low Tg monofunctional monomer includes at least one of acrylate-functionalized compounds i), ii), iii), iv) or vi).

Aspect 20: The curable composition of any of Aspects 17 to 19, wherein the at least one high Tg monofunctional monomer and the at least one low Tg monofunctional monomer are present in a mass ratio of from 1:5 to 5:1.

Aspect 21: A method of making a pressure sensitive adhesive, comprising curing a curable composition in accordance with any of Aspects 1 to 20.

Aspect 22: The method of Aspect 21, wherein curing comprises exposing the curable composition to at least one of ultraviolet light, visible light and electron beam radiation.

Aspect 23: A film, wherein the film is a pressure sensitive adhesive formed by curing the curable composition of any of Aspects 1 to 20.

Aspect 24: An article, wherein the article comprises a film in accordance with Aspect 23 disposed on at least one surface of a substrate.

Aspect 25: The article of Aspect 24, wherein the substrate is a flexible polymeric substrate.

Aspect 26: The article of Aspect 24 or 25, wherein the substrate passes an in vitro cytotoxicity test as measured in accordance with ISO 10993-5 (2009).

Aspect 27: A curable composition, comprising:
a) a (meth)acrylate-functionalized component comprising at least one (meth)acrylate-functionalized compound selected from the group consisting of:
   i) acrylates of ethoxylated phenols containing 3 to 5 oxyethylene units per molecule;
   ii) acrylates of propoxylated nonyl phenols containing 1 to 4 oxypropylene units per molecule;
   iii) 6-methyl-1-heptanol acrylate or isooctyl acrylate;
   iv) acrylates of methoxy polyethylene glycols, the methoxy polyethylene glycols having a number average molecular weight of 300 to 600 g/mol;
   v) tetraethylene glycol diacrylates;
   vi) acrylates of propoxylated tetrahydro-2-furanmethanols containing 1 to 3 oxypropylene units per molecule;
   vii) diacrylates of linear polybutadiene polymers, where the polymers are linear polybutadiene polymers with hydroxyl end groups;

viii) diacrylates of bisphenol A and ethoxylated bisphenol A containing 1 to 35 oxyethylene units per molecule;
ix) diacrylates of ethoxylated 1,6-hexanediols containing 1 to 6 oxyethylene units per molecule;
x) diacrylates of propoxylated 1,6-hexanediols containing 1 to 4 oxypropylene units per molecule;
xi) diacrylates of ethoxylated neopentyl glycols containing 1 to 3 oxyethylene units per molecule;
xii) acrylate-terminated oligomers obtainable by reaction of caprolactone acrylate with a polyisocyanate selected from the group consisting of dicyclohexylmethane diisocyanate, toluene diisocyanate, and hexamethylene diisocyanate biuret;
xiii) acrylate-terminated oligomers obtainable by reaction of 2-hydroxyethyl acrylate, isophorone diisocyanate and neopentyl glycol-co-adipic acid polyester polyol, wherein the polyester polyol has a number average molecular weight of 400 to 2500 g/mol;
xiv) acrylate-terminated oligomers obtainable by reaction of 2-hydroxyethyl acrylate, a diisocyanate selected from isophorone diisocyanate or toluene diisocyanate, and polypropylene glycol, wherein the polypropylene glycol is a diol or triol and has a number average molecular weight of 800 to 5000 g/mol;
xv) acrylate-terminated oligomers obtainable by reaction of 2-hydroxyethyl acrylate, a diisocyanate selected from isophorone diisocyanate or dicyclohexylmethane diisocyanate, and polytetramethylene ether glycol, the polytetramethylene ether glycol having a number average molecular weight of 500 to 1200 g/mol;
xvi) acrylate-terminated oligomers obtainable by reaction of 2-hydroxyethyl acrylate, toluene diisocyanate, and ethylene glycol-co-propylene glycol-co-adipic acid polyester polyol, wherein the polyester polyol has a number average molecular weight of 2500 to 3500 g/mol;
xvii) acrylate-terminated oligomers obtainable by reaction of 2-hydroxyethyl acrylate, a polyisocyanate selected from toluene diisocyanate or dicyclohexylmethane diisocyanate, and ethylene glycol-co-adipic acid polyester polyol, wherein the polyester polyol has a number average molecular weight of 500 to 1000 g/mol;
xviii) acrylate-terminated oligomers obtainable by reaction of 2-hydroxyethyl acrylate, isophorone diisocyanate, and hydroxyl-terminated polysiloxane/polyethylene oxide block copolymer, wherein the hydroxyl-terminated polysiloxane/polyethylene oxide block copolymer has a number average molecular weight of 1500 to 3000 g/mol;
xix) acrylate-terminated oligomers obtainable by reaction of acrylic acid and glycidyl ethers of bisphenol A;
xx) acrylate-terminated oligomers obtainable by reaction of acrylic acid, glycidyl ethers of bisphenol A, diethylene glycol, and phthalic anhydride;
xxi) acrylate-terminated oligomers obtainable by reaction of acrylic acid and glycidyl neodecanoate;
xxii) acrylate-terminated oligomers obtainable by reaction of 2-hydroxyethyl acrylate and hexamethylene diisocyanate biuret;
xxiii) acrylate-terminated oligomers obtainable by reaction of acrylic acid and unsaturated fatty acid dimer diol;
xxiv) acrylate-terminated oligomers obtainable by reaction of acrylic acid, toluene diisocyanate, and bisphenol A; and
xxv) methacrylates of alcohols selected from the group consisting of tetrahydrofurfuryl alcohol; 8-methyl-1-nonanol; isobornyl alcohol; lauryl alcohol; stearyl alcohol; tetraethylene glycol; polyethylene glycols having a number average molecular weight of 150 to 250 g/mol; 1,4-butanediol; 1,6-hexane diol; diethylene glycol; neopentyl glycol; 1,3-butylene glycol; ethoxylated bisphenol A containing 1 to 35 oxyalkylene units per molecule; and 2-(2-(2-ethoxyethoxy)ethoxy ethanol;

b) optionally, at least one comonomer having structure $R^a R^b C = CHR^c$, wherein $R^a$ and $R^b$ are the same as or different from each other and are selected from $-C(=O)XR^d$, $-CH_2C(=O)XR^e$, and $-C(=O)R^f$, subject to the proviso that $R^a$ and $R^b$ are not both $-CH_2C(=O)XR^e$; wherein each X is independently O or $NR^i$, with each $R^i$ being independently selected from H or an organic group, wherein each $R^d$ and $R^e$ is independently selected from H, alkali metal, or an organic group; and wherein each $R^f$ is an organic group; or wherein two of $R^d$, $R^e$ or $R^f$ are taken together with the atoms to which they are bound to form a ring;

c) optionally, at least one initiator system;

d) optionally, at least one additive which is not part of an initiator system;

wherein:

the curable composition has a ratio of moles of methacrylate functional groups to moles of acrylate functional groups of 0:1 to 1:1; and the curable composition, when cured, provides a solid polymeric material which is non-tacky and which passes an in vitro cytotoxicity test as measured in accordance with ISO 10993-5 (2009).

Aspect 28: The curable composition of Aspect 27, wherein the curable composition, when cured, has a glass transition temperature of at least 40° C., at least 50° C. or at least 60° C. or a glass transition temperature of not more than 20° C., not more than 10° C., not more than 0° C., or not more than −10° C.

Aspect 29: The curable composition of Aspect 27 or 28, wherein (meth)acrylate-functionalized compounds i)-xxv) comprise at least 80%, at least 85%, at least 90%, at least 95%, at least 99% or 100% by weight of the total weight of (meth)acrylate-functionalized compounds present in the curable composition.

Aspect 30: The curable composition of any of Aspects 27 to 29, wherein the curable composition comprises at least one of acrylate-functionalized compounds selected from i)-xi), xxv) and at least one of acrylate-functionalized compound xii)-xxiv).

Aspect 31: The curable composition of any of Aspects 27 to 29, wherein the curable composition comprises at least one of acrylate-functionalized compounds xiii)-xviii) and at least one comonomer b) selected from the group consisting of dicyclohexyl methylene malonate, di-isobornyl methylene malonate, ethyl isobornyl methylene malonate, dihexyl methylene malonate and diethyl methylene malonate.

Aspect 32: The curable composition of any of Aspects 27 to 31, wherein the curable composition comprises at least one initiator system and wherein the at least one initiator system comprises at least one photoinitiator.

Aspect 33: The curable composition of Aspect 32, wherein the at least one photoinitiator comprises at least one photoinitiator selected from the group consisting of α-hydroxyketones, phenylglyoxylates, benzyldimethylketals, α-aminoketones, mono-acyl phosphines, bis-acyl phosphines, phosphine oxides and metallocenes.

Aspect 34: The curable composition of any of Aspects 27 to 33, additionally comprising at least one (meth)acrylate-functionalized compound comprising three or more (meth) acrylate functional groups per molecule.

Aspect 35: The curable composition of any of Aspects 27 to 34, having a viscosity at 25° C. of not more than 10,000 cP, not more than 8000 cP or not more than 6000 cP.

Aspect 36: The curable composition of any of Aspects 27 to 35, wherein the curable composition additionally comprises one or more additives selected from the group consisting of wetting agents, matting agents, colorants, dyes, pigments, adhesion promoters, fillers, rheology modifiers, thixotropic agents, plasticizers, UV absorbers, UV stabilizing agents, dispersants, antioxidants, antistatic agents, lubricants, opacifying agents, anti-foam agents, and rheology agents.

Aspect 37: A method of making a non-tacky film, comprising curing a layer of a curable composition in accordance with any of Aspects 27 to 32.

Aspect 38: The method of Aspect 37, wherein curing comprises exposing the curable composition to at least one of ultraviolet light, visible light and electron beam radiation.

Aspect 39: A non-tacky film, wherein the non-tacky film is formed by curing the curable composition of any of Aspects 27 to 36.

Aspect 40: An article, wherein the article comprises a non-tacky film in accordance with Aspect 39 disposed on at least one surface of a substrate.

Aspect 41: The article of Aspect 40, wherein the substrate is a film release liner.

Aspect 42: The article of Aspect 40 or 41, wherein the article additionally comprises a film of a pressure sensitive adhesive which passes an in vitro cytotoxicity test as measured in accordance with ISO 10993-5 (2009) disposed on the non-tacky film.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the curable compositions, materials, products and articles prepared therefrom and methods for making and using such curable compositions described herein. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

EXAMPLES

Example 1

This Example demonstrates the preparation of a non-sensitizing pressure sensitive adhesive in accordance with the present invention. The components listed in Table 1 were used to prepare a curable composition.

TABLE 1

| Component | Wt. % on Total | Mass (g) |
|---|---|---|
| Acrylate-functionalized Compound A | 40.50 | 20.25 |
| Acrylate-functionalized Compound B | 45.00 | 22.50 |
| Photoinitiator | 4.50 | 2.25 |
| Tackifier | 10.00 | 5.00 |
| Sum | 100.00 | 50.00 |

Acrylate-functionalized Compound A: urethane acrylate oligomer (obtained from diisocyanate, 2-hydroxyethyl acrylate and polyether glycol).
Acrylate-functionalized Compound B: isooctyl acrylate.
Photoinitiator: phosphine oxide photoinitiator.
Tackifier: rosin ester tackifier.

Procedure:

The curable composition described above was prepared by mixing the components at 60° C. for 3 hours. The curable composition, which was in the form of a liquid at room temperature, was applied at a thickness of 2.5 mil to a 2 mil thick polyethylene terephthalate (PET) film. Within 5 minutes of coating, the liquid-coated film was passed twice under a 395 nm LED at a speed of 50 fpm. After exposing to the energy source, the sample was allowed to remain at room temperature for 24 hours. After this post-cure time, peel testing and probe tack testing were performed. Skin safety testing in accordance with ISO 10993-5 (2009) was performed about 1 week after the curing step.

Peel testing was performed by first applying a 1"-wide strip of the cured sample to a stainless steel panel (ChemInstruments) followed by 2 passes of a 4.5 pound automatic roller. The PSA-laminated panel was stored in a constant humidity room (72° F. and 60% humidity) for a predetermined dwell time of 1 hour before testing. The peel strength was measured at a 1800 angle with a peel speed of 12 in/min following the ASTM-D903-98 standard using a tensile tester (Instron 5543).

Probe tack was measured according to ASTM-D2979-95 using a ChemInstruments© PT-500 Inverted Probe Machine in the tension-peak mode. The instrument readout gave the probe tack as force in lb, which was converted to lb/in$^2$ by dividing that result by the surface area of the part of the probe that contacts the sample.

Results:

Curable composition viscosity: 303 cP at room temperature.

Curable composition characteristics: transparent, yellow color.

Cured PSA characteristics: transparent with little to no residual yellow color.

Cured PSA peel strength: 0.98 lb/in.

Cured PSA probe tack: 8.90 lb/in$^2$.

Cured PSA skin safety: Not cytotoxic.

Example 2

This Example demonstrates the preparation of a non-sensitizing pressure sensitive adhesive in accordance with the present invention which does not contain a tackifier, unlike the curable composition of Example 1. The components listed in Table 2 were used to prepare a curable composition.

TABLE 2

| Component | Wt. % on Total | Mass (g) |
|---|---|---|
| Acrylate-functionalized Compound A | 20.00 | 10.00 |
| Acrylate-functionalized Compound B | 50.00 | 25.00 |
| Acrylate-functionalized Compound C | 25.00 | 12.50 |
| Photoinitiator | 5.00 | 2.50 |
| Sum | 100.00 | 50.00 |

Acrylate-functionalized Compound A: urethane acrylate oligomer (obtained from diisocyanate, 2-hydroxyethyl acrylate and polyether glycol).
Acrylate-functionalized Compound B: isooctyl acrylate.
Acrylate-functionalized Compound C: urethane acrylate oligomer (obtained from diisocyanate, 2-hydroxyethyl acrylate and polypropylene glycol).
Photoinitiator: phosphine oxide photoinitiator (same as Example 1).

Procedure:
Example 2 followed the same procedure as Example 1.
Results:
Curable composition viscosity: 718 cP at room temperature.
Curable composition characteristics: transparent, yellow color.
Cured PSA characteristics: transparent with little to no residual yellow color.
Cured PSA peel strength: 0.39 lb/in.
Cured PSA probe tack: 5.21 lb/in$^2$.
Cured PSA skin safety: Not cytotoxic.

Example 3

This Example demonstrates the preparation of a non-sensitizing pressure sensitive adhesive in accordance with the present invention which comprises a comonomer which is not acrylate-functionalized. The components listed in Table 3 were used to prepare a curable composition.

TABLE 3

| Component | Wt. % on Total | Mass (g) |
|---|---|---|
| Acrylate-functionalized Compound D | 53.00 | 8.48 |
| Acrylate-functionalized Compound B | 20.00 | 6.12 |
| Acrylate-functionalized Compound E | 2.00 | 0.40 |
| Comonomer Compound F | 10.00 | 2.00 |
| Tackifier | 10.00 | 2.00 |
| Photoinitiator | 5.00 | 1.00 |
| Sum | 100.00 | 20.00 |

Acrylate-functionalized Compound D: blended mixture of 80% urethane acrylate oligomer (obtained from diisocyanate, 2-hydroxyethyl acrylate and neopentyl glycol-co-adipic acid polyester polyol) and 20% isooctyl acrylate.
Acrylate-functionalized Compound B: isooctyl acrylate.
Acrylate-functionalized Compound E: ethoxylated pentaerythritol tetraacrylate.
Comonomer Compound F: dicyclohexyl methylene malonate.
Tackifier: rosin ester tackifier.
Photoinitiator: phosphine oxide photoinitiator (same as Example 1).

Procedure:
Example 3 followed the same procedure as Example 1 with the exception of a slightly different mixing procedure. Specifically, Photoinitiator was blended with the Acrylate-functionalized Compounds and tackifier at 60° C. before Comonomer Compound F was added and blended at 25° C.
Results:
Curable composition characteristics: transparent, yellow color.
Cured PSA characteristics: transparent with little to no residual yellow color.
Cured PSA peel strength: 6.15 lb/in.
Cured PSA probe tack: 20.70 lb/in$^2$.
Cured PSA skin safety: Not cytotoxic.

Example 4

This Example demonstrates the preparation of a non-sensitizing, non-tacky film in accordance with the present invention. The components listed in Table 4 were used to prepare a curable composition.

TABLE 4

| Component | Wt. % on Resin | Mass (g) |
|---|---|---|
| Acrylate-functionalized Compound A | 60.00 | 291.00 |
| Acrylate-functionalized Compound G | 40.00 | 194.00 |
| Photoinitiator | 3.00 | 15.00 |
| Sum | 100.00 | 500.00 |

Acrylate-functionalized Compound A: urethane acrylate oligomer (obtained from diisocyanate, 2-hydroxyethyl acrylate and polytetramethylene glycol).
Acrylate-functionalized Compound G: isobornyl methacrylate.
Photoinitiator: phosphine oxide photoinitiator (same as Example 1).

Procedure:
Example 4 followed the same procedure for preparing and curing the curable composition as Example 1. However, the cured composition obtained in Example 4 was not an adhesive and so did not undergo peel testing or probe tack testing.
Results:
Liquid composition viscosity: 5,300 cP at room temperature.
Liquid composition characteristics: transparent, yellow color.
Cured PSA characteristics: flexible transparent film with little to no residual yellow color.
Cured PSA skin safety: Not cytotoxic.

Example 5 (Comparative)

This Example is a comparative example which demonstrates that the skin sensitization properties of an energy-cured pressure sensitive adhesive are impacted by the components used to formulate the curable composition from which the PSA is prepared. The components listed in Table 5 were used to prepare a curable composition.

TABLE 5

| Component | Wt. % on Total |
|---|---|
| Acrylate-functionalized Compound H | 47.04 |
| Acrylate-functionalized Compound I | 23.56 |
| Acrylate-functionalized Compound J | 21.60 |
| Tackifier | 2.90 |
| Photoinitiator | 4.90 |
| Sum | 100.00 |

Acrylate-functionalized Compound H: blended mixture of 80% by weight urethane acrylate oligomer (obtained from diisocyanate, 2-hydroxyethyl acrylate and polyester polyol) and 20% by weight isobornyl acrylate.
Acrylate-functionalized Compound I: isobornyl acrylate.
Acrylate-functionalized Compound J: propoxylated tetrahydrofurfuryl acrylate.
Tackifier: rosin ester tackifier (same as Example 1).
Photoinitiator: phosphine oxide initiator.

Procedure:
Example 5 followed the same procedure for preparing and curing the cured composition as Example 1. While the cured composition obtained in Example 5 was a pressure sensitive adhesive, it failed a cytotoxicity test (conducted in accordance with ISO 10993-5 (2009)).

The invention claimed is:

1. A curable composition, comprising:
   a) an acrylate-functionalized component comprising at least one acrylate-functionalized compound selected from the group consisting of i)-xi) and at least one acrylate-functionalized compound selected from the group consisting of xii)-xxiv):
      i) acrylates of ethoxylated phenols containing 3 to 5 oxyethylene units per molecule;
      ii) acrylates of propoxylated nonyl phenols containing 1 to 4 oxypropylene units per molecule;
      iii) 6-methyl-1-heptanol acrylate or isooctyl acrylate;
      iv) acrylates of methoxy polyethylene glycols, wherein the methoxy polyethylene glycols have a number average molecular weight of 300 to 600 g/mol;
      v) tetraethylene glycol diacrylates;
      vi) acrylates of propoxylated tetrahydro-2-furanmethanols containing 1 to 3 oxypropylene units per molecule;
      vii) diacrylates of linear polybutadiene polymers, where the polymers are linear polybutadiene polymers with hydroxyl end groups;
      viii) diacrylates of bisphenol A and ethoxylated bisphenol A containing 1 to 35 oxyethylene units per molecule;
      ix) diacrylates of ethoxylated 1,6-hexanediols containing 1 to 6 oxyethylene units per molecule;
      x) diacrylates of propoxylated 1,6-hexanediols containing 1 to 4 oxypropylene units per molecule;
      xi) diacrylates of ethoxylated neopentyl glycols containing 1 to 3 oxyethylene units per molecule;
      xii) acrylate-terminated oligomers obtainable by reaction of caprolactone acrylate with a polyisocyanate selected from the group consisting of dicyclohexylmethane diisocyanate, toluene diisocyanate, and hexamethylene diisocyanate biuret;
      xiii) acrylate-terminated oligomers obtainable by reaction of 2-hydroxyethyl acrylate, isophorone diisocyanate and neopentyl glycol-co-adipic acid polyester polyol, the polyester polyol having a number average molecular weight of 400 to 2500 g/mol;
      xiv) acrylate-terminated oligomers obtainable by reaction of 2-hydroxyethyl acrylate, a diisocyanate selected from toluene diisocyanate or isophorone diisocyanate, and polypropylene glycol, wherein the polypropylene glycol is a diol or triol and has a number average molecular weight of 800 to 5000 g/mol;
      xv) acrylate-terminated oligomers obtainable by reaction of 2-hydroxyethyl acrylate, a diisocyanate selected from isophorone diisocyanate or dicyclohexylmethane diisocyanate, and polytetramethylene ether glycol, wherein the polytetramethylene glycol has a number average molecular weight of 500 to 1200 g/mol;
      xvi) acrylate-terminated oligomers obtainable by reaction of 2-hydroxyethyl acrylate, toluene diisocyanate, and ethylene glycol-co-propylene glycol-co-adipic acid polyester polyol, wherein the polyester polyol has a number average molecular weight of 2500 to 3500 g/mol;
      xvii) acrylate-terminated oligomers obtainable by reaction of 2-hydroxyethyl acrylate, a polyisocyanate selected from toluene diisocyanate or dicyclohexylmethane diisocyanate, and ethylene glycol-co-adipic acid polyester polyol, wherein the polyester polyol has a number average molecular weight of 500 to 1000 g/mol;
      xviii) acrylate-terminated oligomers obtainable by reaction of 2-hydroxyethyl acrylate, isophorone diisocyanate, and hydroxyl-terminated polysiloxane/polyethylene oxide block copolymer, wherein the hydroxyl-terminated polysiloxane/polyethylene oxide block copolymer has a number average molecular weight of 1500 to 3000 g/mol;
      xix) acrylate-terminated oligomers obtainable by reaction of acrylic acid and glycidyl ethers of bisphenol A;
      xx) acrylate-terminated oligomers obtainable by reaction of acrylic acid, glycidyl ethers of bisphenol A, diethylene glycol, and phthalic anhydride;
      xxi) acrylate-terminated oligomers obtainable by reaction of acrylic acid and glycidyl neodecanoate;
      xxii) acrylate-terminated oligomers obtainable by reaction of 2-hydroxyethyl acrylate and hexamethylene diisocyanate biuret;
      xxiii) acrylate-terminated oligomers obtainable by reaction of acrylic acid and unsaturated fatty acid dimer diol; and
      xxiv) acrylate-terminated oligomers obtainable by reaction of acrylic acid, toluene diisocyanate, and bisphenol A;
   b) 0 to 5% by weight in total, based on the weight of the curable composition, of (meth) acrylate-functionalized compounds comprising three or more (meth) acrylate functional groups per molecule;
   c) optionally, at least one comonomer having structure $R^a R^b C = CHR^c$, wherein $R^a$ and $R^b$ are the same as or different from each other and are selected from $-C(=O) XR^d$, $-CH^2 C(=O)XR^e$, and $-C(=O)R^f$, subject to the proviso that $R^a$ and $R^b$ are not both $-CH^2 C(=O)XR^e$; wherein each X is independently O or $NR^i$, with each $R^i$ being independently selected from H or an organic group, wherein each $R^d$ and $R^e$ is independently selected from H, alkali metal, or an organic group; and wherein each $R^f$ is an organic group; or wherein two of $R^d$, $R^e$ or $R^f$ are taken together with the atoms to which they are bound to form a ring;
   d) optionally, at least one tackifier;
   e) optionally, at least one initiator system;
   f) optionally, at least one additive which is not a tackifier or part of an initiator system;
   wherein:
   the curable composition has a ratio of moles of methacrylate functional groups to moles of acrylate functional groups of 0:1 to 1:1; and
   the curable composition, when cured, provides a pressure sensitive adhesive which passes an in vitro cytotoxicity test as measured in accordance with ISO 10993-5 (2009),
   wherein acrylate-functionalized compounds i)-xxiv) comprise at least 80% by weight of the total weight of (meth)acrylate-functionalized compounds present in the curable composition.

2. The curable composition of claim 1, wherein the curable composition has a ratio of moles of methacrylate functional groups to moles of acrylate functional groups of 0:1 to 0.5:1; 0:1 to 0.2:1; 0:1 to 0.1:1; or 0:1 to 0.05:1.

3. The curable composition of claim 1, wherein the curable composition, when cured, has a glass transition temperature of not more than 20° C.

4. The curable composition of claim 1, wherein the curable composition comprises at least one initiator system and wherein the at least one initiator system comprises at least one photoinitiator.

5. The curable composition of claim 1, further comprising methacrylate-functionalized compounds in an amount up to 1% by weight in total, based on the weight of the curable composition.

6. The curable composition of claim 1, comprising acrylate-functionalized compounds comprising three or more acrylate functional groups per molecule in an amount up to 4% by weight in total, based on the weight of the curable composition.

7. The curable composition of claim 1, comprising the at least one tackifier in an amount up to 35% by weight, based on the weight of the curable composition.

8. The curable composition of claim 7, wherein the one or more tackifiers are selected from the group consisting of hydrogenated and non-hydrogenated piperylene-based hydrocarbon resins, hydrogenated and non-hydrogenated rosin esters, and maleic anhydride-modified rosin esters.

9. The curable composition of claim 1, wherein the curable composition additionally comprises one or more additives selected from the group consisting of wetting agents, matting agents, colorants, dyes, pigments, adhesion promoters, fillers, rheology modifiers, thixotropic agents, plasticizers, UV absorbers, UV stabilizing agents, dispersants, antioxidants, antistatic agents, lubricants, opacifying agents, anti-foam agents, and rheology agents.

10. The curable composition of claim 1, wherein the curable composition comprises at least one of acrylate-functionalized compounds xiii)-xviii), at least one high Tg monofunctional monomer, and at least one low Tg monofunctional monomer.

11. The curable composition of claim 10, wherein the at least one high Tg monofunctional monomer includes at least one comonomer having structure $R^a R^b C=CHR^c$, wherein $R^a$ and $R^b$ are the same as or different from each other and are selected from $-C(=O)XR^d$, $-CH_2C(=O)XR^e$, and $-C(=O)R^f$, subject to the proviso that $R^a$ and $R^b$ are not both $-CH_2C(=O)XR^e$; wherein each X is independently O or $NR^i$, with each $R^i$ being independently selected from H or an organic group, wherein each $R^d$ and $R^e$ is independently selected from H, alkali metal, or an organic group; and wherein each $R^f$ is an organic group; or wherein two of $R^d$, $R^e$ or $R^f$ are taken together with the atoms to which they are bound to form a ring.

12. The curable composition of claim 10, wherein the at least one low Tg monofunctional monomer includes at least one of acrylate-functionalized compounds i), ii), iii), iv) or vi).

13. The curable composition of claim 10, wherein the at least one high Tg monofunctional monomer and the at least one low Tg monofunctional monomer are present in a mass ratio of from 1:5 to 5:1.

14. The curable composition of claim 1, wherein the curable composition comprises at least one of acrylate-functionalized compounds i)-xi) and at least one of acrylate-functionalized compounds xiii)-xviii).

15. The curable composition of claim 1, wherein the curable composition comprises at least one acrylate-functionalized compound iii) and at least one acrylate-functionalized compound xiii).

16. The curable composition of claim 1, wherein the curable composition comprises at least one acrylate-functionalized compound iii), at least one acrylate-functionalized compound xiii), and at least one comonomer c) selected from the group consisting of dicyclohexyl methylene malonate, di-isobornyl methylene malonate, ethyl isobornyl methylene malonate, dihexyl methylene malonate and diethyl methylene malonate.

17. A method of making a pressure sensitive adhesive, comprising curing a curable composition in accordance with claim 1.

18. The method of claim 17, wherein curing comprises exposing the curable composition to at least one of ultraviolet light, visible light and electron beam radiation.

19. A film, wherein the film is a pressure sensitive adhesive formed by curing the curable composition of claim 1.

20. An article, wherein the article comprises a film in accordance with claim 19 disposed on at least one surface of a substrate.

21. The article of claim 20, wherein the substrate is a flexible polymeric substrate.

22. The article of claim 20, wherein the substrate passes an in vitro cytotoxicity test as measured in accordance with ISO 10993-5 (2009).

* * * * *